(12) United States Patent
Kishi

(10) Patent No.: US 9,025,204 B2
(45) Date of Patent: May 5, 2015

(54) IMAGE CREATING APPARATUS HAVING COLOR ARRANGEMENT CHANGING UNIT AND IMAGE CREATING APPARATUS HAVING COLOR ARRANGEMENT RESTORING UNIT

(71) Applicant: Kyocera Document Solutions Inc., Osaka (JP)

(72) Inventor: Yoshitaka Kishi, Osaka (JP)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/455,931

(22) Filed: Aug. 10, 2014

(65) Prior Publication Data

US 2014/0347682 A1 Nov. 27, 2014

Related U.S. Application Data

(62) Division of application No. 13/778,736, filed on Feb. 27, 2013, now Pat. No. 8,830,525.

(30) Foreign Application Priority Data

Feb. 29, 2012 (JP) ................................. 2012-043113

(51) Int. Cl.
*H04N 1/60* (2006.01)
*G06K 15/02* (2006.01)
(Continued)

(52) U.S. Cl.
CPC ........ *G06K 15/1878* (2013.01); *H04N 1/32208* (2013.01); *H04N 1/32309* (2013.01);
(Continued)

(58) Field of Classification Search
None
See application file for complete search history.

(56) References Cited

U.S. PATENT DOCUMENTS 5,438,651 A 8/1995 Suzuki et al.
5,732,153 A * 3/1998 Ohsawa ........................ 382/191
(Continued)

FOREIGN PATENT DOCUMENTS

JP 2001-293926 A 10/2001
JP 2007-240508 A 9/2007
(Continued)

OTHER PUBLICATIONS

Extended European Search Report and Opinion for App. No. EP 13157174.7, mailed Dec. 4, 2014, 5 pages.

*Primary Examiner* — Dung Tran
(74) *Attorney, Agent, or Firm* — McDonnell Boehnen Hulbert & Berghoff LLP

(57) ABSTRACT

An image creating apparatus has a printing device configured to print a changed image on a recording medium; a difficult-to-recognize color arrangement storage unit configured to store a difficult-to-recognize color arrangement that is difficult to visually recognize; an object extracting unit configured to extract objects from an original image; a difficult-to-recognize object detecting unit configured to detect a difficult-to-recognize object; a representative color obtaining unit configured to obtain the representative color of the difficult-to-recognize object; a color arrangement changing unit configured to (i) change the color arrangement of the image so that the color arrangement of the periphery is changed from the difficult-to-recognize color arrangement in at least part of the difficult-to-recognize object and (ii) embed information about the representative color as dots; and a changed image printing unit configured to command the printing device to print the changed image with the changed color arrangement.

4 Claims, 18 Drawing Sheets

(51) Int. Cl.
*H04N 1/32* (2006.01)
*H04N 1/56* (2006.01)
*H04N 1/62* (2006.01)
*H04N 1/50* (2006.01)

(52) U.S. Cl.
CPC .... *H04N2201/3242* (2013.01); *H04N 1/32229* (2013.01); *H04N 1/32267* (2013.01); *H04N 1/32325* (2013.01); *H04N 2201/3269* (2013.01); *H04N 2201/3259* (2013.01); *H04N 1/56* (2013.01); *H04N 1/62* (2013.01); *G06K 2215/0094* (2013.01); *H04N 1/502* (2013.01); *H04N 1/60* (2013.01); *H04N 2201/0094* (2013.01)

(56) References Cited

U.S. PATENT DOCUMENTS

| | | | |
|---|---|---|---|
| 5,796,874 A * | 8/1998 | Woolfe et al. | 382/254 |
| 6,415,052 B1 * | 7/2002 | Ohsawa | 382/191 |
| 6,809,741 B1 | 10/2004 | Bates et al. | |
| 7,859,545 B2 | 12/2010 | Tokunaga | |
| 7,982,907 B2 * | 7/2011 | Hashimoto et al. | 358/1.9 |
| 8,023,736 B2 * | 9/2011 | Tsukada | 382/173 |
| 8,456,694 B2 | 6/2013 | Beretta | |
| 8,605,163 B2 * | 12/2013 | Hatakeyama | 348/222.1 |
| 8,830,351 B2 * | 9/2014 | Hatakeyama et al. | 348/223.1 |
| 2005/0274804 A1 | 12/2005 | Matsumoto | |
| 2006/0250669 A1 | 11/2006 | Beretta | |
| 2008/0023546 A1 | 1/2008 | Myodo et al. | |
| 2008/0100870 A1 | 5/2008 | Fujii et al. | |
| 2010/0245896 A1 | 9/2010 | Mishima | |
| 2013/0182268 A1 * | 7/2013 | Ono | 358/1.9 |

FOREIGN PATENT DOCUMENTS

| | | |
|---|---|---|
| JP | 2010-2952 A | 1/2010 |
| JP | 2010-4101 A | 1/2010 |
| JP | 2011-188367 A | 9/2011 |

* cited by examiner

IMAGE CREATING APPARATUS HAVING COLOR ARRANGEMENT CHANGING UNIT AND IMAGE CREATING APPARATUS HAVING COLOR ARRANGEMENT RESTORING UNIT

CROSS-REFERENCE TO RELATED APPLICATION AND INCORPORATION BY REFERENCE

This divisional patent application claims priority to U.S. Patent Application No. 13/778,736 filed on Feb. 27, 2013, and is based upon, and claims the benefit of priority from, corresponding Japanese Patent Application No. 2012-043113 filed in the Japan Patent Office on Feb. 29, 2012, the entire contents of which are incorporated herein by reference.

FIELD

The present disclosure relates to an image creating apparatus that has a color arrangement changing unit that changes an image having a color arrangement that is difficult to visually recognize to improve its visibility. The present disclosure also relates to an image creating apparatus that has a color arrangement restoring unit, which restores an image, printed on a recording medium, that has a changed color arrangement to the original image.

BACKGROUND

A typical changed-color-arrangement image creating apparatus creates an image having a changed color arrangement by changing an image having a color arrangement that is difficult to visually recognize (referred to below as the original image) to an image having a color arrangement for which visibility has been improved (referred to below as the changed image).

However, this type of changed-color-arrangement image creating apparatus cannot restore the original image from the changed image. That is, the changed-color-arrangement image creating apparatus cannot restore the original image from the recording medium on which the changed image is printed.

SUMMARY

The image creating apparatus according to an embodiment of the present disclosure includes a printing device, a difficult-to-recognize color arrangement storage unit, an object extracting unit, a difficult-to-recognize object detecting unit, a representative color obtaining unit, a color arrangement changing unit, and a changed image printing unit. The printing device prints an image on a recording medium. The difficult-to-recognize color arrangement storage unit stores a difficult-to-recognize color arrangement that is difficult to visually recognize. The object extracting unit extracts objects from an image. The difficult-to-recognize object detecting unit detects, from among the extracted objects, a difficult-to-recognize object that has the difficult-to-recognize color arrangement (stored in the difficult-to-recognize color arrangement storage unit) as a color arrangement to the color of a periphery of the difficult-to-recognize object. The representative color obtaining unit obtains the representative color of the difficult-to-recognize object. The color arrangement changing unit changes the color of at least a partial area of the difficult-to-recognize object so that the color arrangement to the color of the periphery of the difficult-to-recognize object is changed from the difficult-to-recognize color arrangement. The color arrangement changing unit also embeds information about the representative color obtained by the representative color obtaining unit. The changed image printing unit commands the printing device to print, on a recording medium, an image obtained as a result of the color arrangement being changed by the color arrangement changing unit.

A non-transitory computer-readable recording medium storing a printer driver according to an embodiment of the present disclosure controls a color image creating apparatus having a printing device that prints an image on a recording medium; the printer driver causes a computer, having a difficult-to-recognize color arrangement storage unit that stores a difficult-to-recognize color arrangement that is difficult to visually recognize, to execute an object extracting step of extracting objects from an image, a difficult-to-recognize object detecting step of detecting, from among the extracted objects, a difficult-to-recognize object that has the difficult-to-recognize color arrangement (stored in the difficult-to-recognize color arrangement storage unit) as a color arrangement to the color of a periphery of the difficult-to-recognize object, a representative color obtaining step of obtaining the representative color of the difficult-to-recognize object detected in the difficult-to-recognize object detecting step, a color arrangement changing step of changing the color arrangement of the image by assigning, to at least a partial area of the difficult-to-recognize object detected in the difficult-to-recognize object detecting step, a color by which the color arrangement to the color of the periphery of the difficult-to-recognize object is changed from the difficult-to-recognize color arrangement stored in the difficult-to-recognize color arrangement storage unit, and a changed image transmitting step of transmitting, to the color image creating apparatus as print data, an image obtained as a result of the color arrangement being changed in the color arrangement changing step; in the color arrangement changing step, information about the representative color obtained in the representative color obtaining step is embedded in the partial area as dots.

An image creating apparatus having a color arrangement restoring unit according to an embodiment of the present disclosure includes a printing device that prints an image on a recording medium, a reading device that reads an image from a draft, an area extracting unit that extracts from the image read by the reading device an area in which information about a color has been embedded as dots, an area color obtaining unit that obtains a color corresponding to the information embedded as dots in the area extracted by the area extracting unit, a color arrangement restoring unit that restores the color arrangement of the image read by the reading device from the draft by assigning the color obtained by the area color obtaining unit to the area extracted by the area extracting unit, and a restored image printing unit that commands the printing device to print, on a printing medium, an image obtained as a result of the color arrangement being restored by the color arrangement restoring unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

First Embodiment

First, the structure of a network system in this embodiment will be described.

Figure 1:
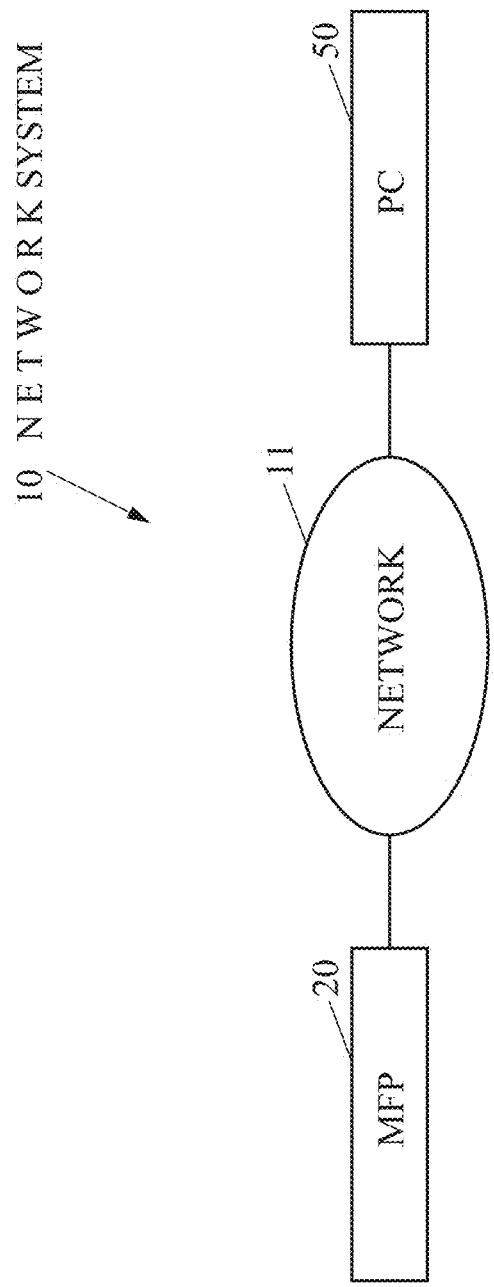
FIG. 1 shows a block diagram illustrating a configuration of a network system in a first embodiment of the present disclosure.

FIG. 1 shows a block diagram illustrating the configuration of the network system 10 in this embodiment. As illustrated in FIG. 1, the network system 10 includes a multi-function peripheral (MFP) 20, which is a color image creating apparatus; and a personal computer (PC) 50, which is a type of computer. The MFP 20 and PC 50 are inter-connected through a network 11 such as a local area network (LAN) or the Internet, so that it is possible to communicate between the MFP 20 and PC 50.

Figure 2:
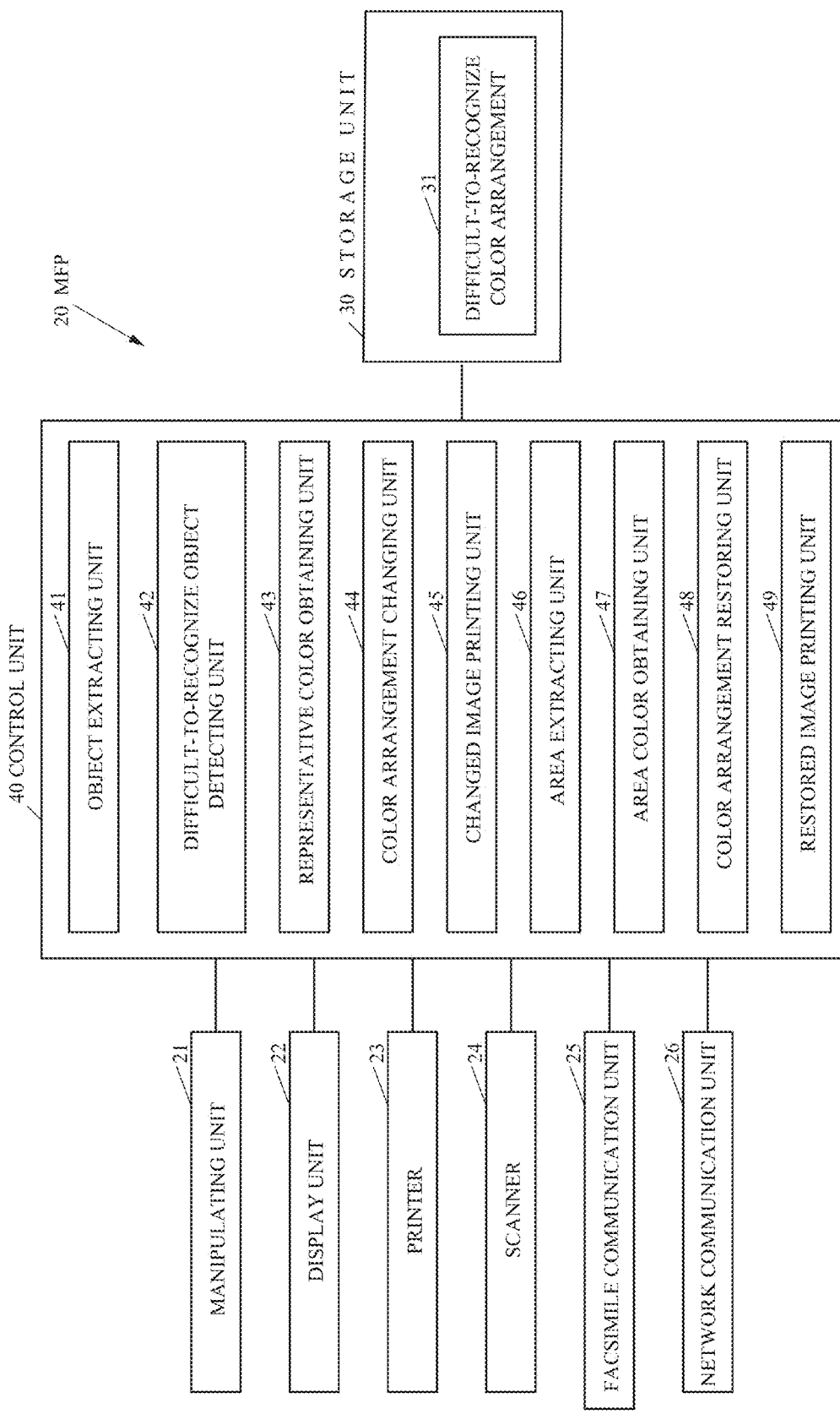
FIG. 2 shows a block diagram illustrating a configuration of a multi-function peripheral (MFP) in the network system.

FIG. 2 shows a block diagram illustrating the configuration of the MFP 20. As illustrated in FIG. 2, the MFP 20 includes a manipulating unit 21, which is an input device such as a device having buttons, by which various manipulations made by the user are input; a display unit 22, which is a display device such as a liquid crystal display (LCD) that displays various types of information; a printer 23, which is a printing device that prints an image on a recording medium such as paper; and a scanner 24, which is a reading device that reads an image from a draft. The MFP 20 also includes a facsimile communication unit 25, which is a facsimile machine that carries out facsimile communication through a communication line such as a public telephone line; a network communication unit 26, which is a network communication device communicating through the network 11; a storage unit 30, which is a storage device such as an electrically erasable programmable read-only memory (EEPROM) or a hard disk drive (HDD), and in which programs and various types of data are stored; and a control unit 40 that controls the whole of the MFP 20.

The storage unit 30 is the difficult-to-recognize color arrangement storage unit in the present invention. It stores a difficult-to-recognize color arrangement 31, which is a color arrangement that is difficult to visually recognize. The difficult-to-recognize color arrangement 31 includes various color arrangement patterns.

The control unit 40 includes, for example, a central processing unit (CPU), a read-only memory (ROM) that stores programs and various types of data, and a random-access memory (RAM) that is used by the CPU as a working area. The CPU executes programs stored in the ROM or storage unit 30.

When executing programs stored in the storage unit 30, the control unit 40 functions as an object extracting unit 41, a difficult-to-recognize object detecting unit 42, a representative color obtaining unit 43, a color arrangement changing unit 44, and a changed image printing unit 45. The object extracting unit 41 extracts objects such as text and figures from an image. The difficult-to-recognize object detecting unit 42 detects, from among the extracted objects, a difficult-to-recognize object 41 that has the difficult-to-recognize color arrangement 31 (stored in the storage unit 30) as a color arrangement to the color of a periphery of the difficult-to-recognize object. The representative color obtaining unit 43 obtains the representative color of the difficult-to-recognize object detected by the difficult-to-recognize object detecting unit 42. The color arrangement changing unit 44 changes the color arrangement of the image by assigning, to at least a partial area of the difficult-to-recognize object detected by the difficult-to-recognize object detecting unit 42, a color by which the color arrangement to the color of the periphery of the difficult-to-recognize object is changed from the difficult-to-recognize color arrangement 31 stored in the storage unit 30. The changed image printing unit 45 commands the printer 23 to print, on a recording medium, an image obtained as a result of the color arrangement being changed by the color arrangement changing unit 44. Accordingly, the MFP 20 constitutes the image forming apparatus having a color arrangement changing unit in the present disclosure.

When executing other programs stored in the storage unit 30, the control unit 40 also functions as an area extracting unit 46, an area color obtaining unit 47, a color arrangement restoring unit 48, and a restored image printing unit 49. The area extracting unit 46 extracts from the image read by the scanner 24 an area in which information about a color has been embedded as dots. The area color obtaining unit 47 obtains a color corresponding to the information embedded as dots in the area extracted by the area extracting unit 46. The color arrangement restoring unit 48 restores the color arrangement of the image read by the scanner 24 by assigning the color obtained by the area color obtaining unit 47 to the area extracted by the area extracting unit 46. The restored image printing unit 49 commands the printer 23 to print, on a printing medium, an image obtained as a result of the color arrangement being restored by the color arrangement restoring unit 48. Accordingly, the MFP 20 constitutes the image forming apparatus having a color arrangement restoring unit in the present disclosure.

Figure 3:
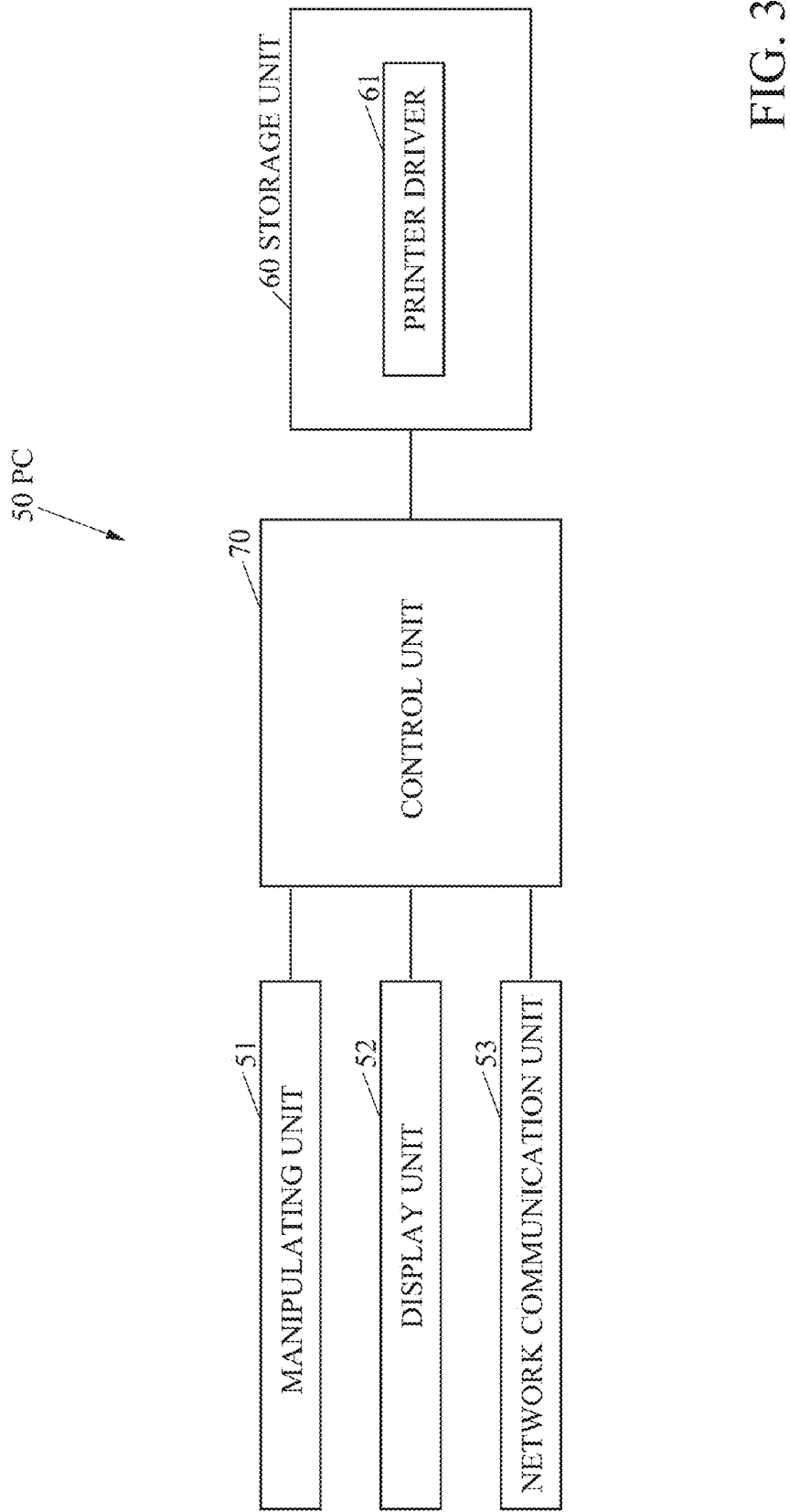
FIG. 3 shows a block diagram illustrating a configuration of a personal computer (PC) in the network system.

FIG. 3 shows a block diagram illustrating the configuration of the PC 50. As illustrated in FIG. 3, the PC 50 includes a manipulating unit 51, which is an input device such as a mouse, a keyboard, or the like, and by which various manipulations made by the user are input; a display unit 52 that is a display device such as an LCD that displays various types of information; and a network communication unit 53, which is a network communication device that communicates through the network 11. The PC 50 also includes a storage unit 60, which is a storage device such as an HDD in which programs and various types of data are stored; and a control unit 70 that controls the whole of the PC 50.

A printer driver 61 that controls the MFP 20 is stored in the storage unit 60. The printer driver 61 may be installed on the PC 50 during the manufacturing of the PC 50. Alternatively, the printer driver 61 may be added to the PC 50 from a universal serial bus (USB) memory, a compact disc (CD), a digital versatile disc (DVD), or another storage medium, or through the network 11.

The control unit 70 includes, for example, a CPU, a ROM in which programs and various types of data are stored, and a RAM used by the CPU as a working area. The CPU executes programs stored in the ROM or storage unit 60.

Next, the operation of the network system 10 will be described.

First, an operation of the MFP 20 that is executed to perform a copy operation will be described. A user places a draft on the scanner 24 and manipulates the manipulating unit 21 to command the MFP 20 to execute a copy operation. After the user has commanded the MFP 20 to execute the copy operation through the manipulating unit 21, the control unit 40 in the MFP 20 starts process illustrated in FIG. 4.

Figure 4:
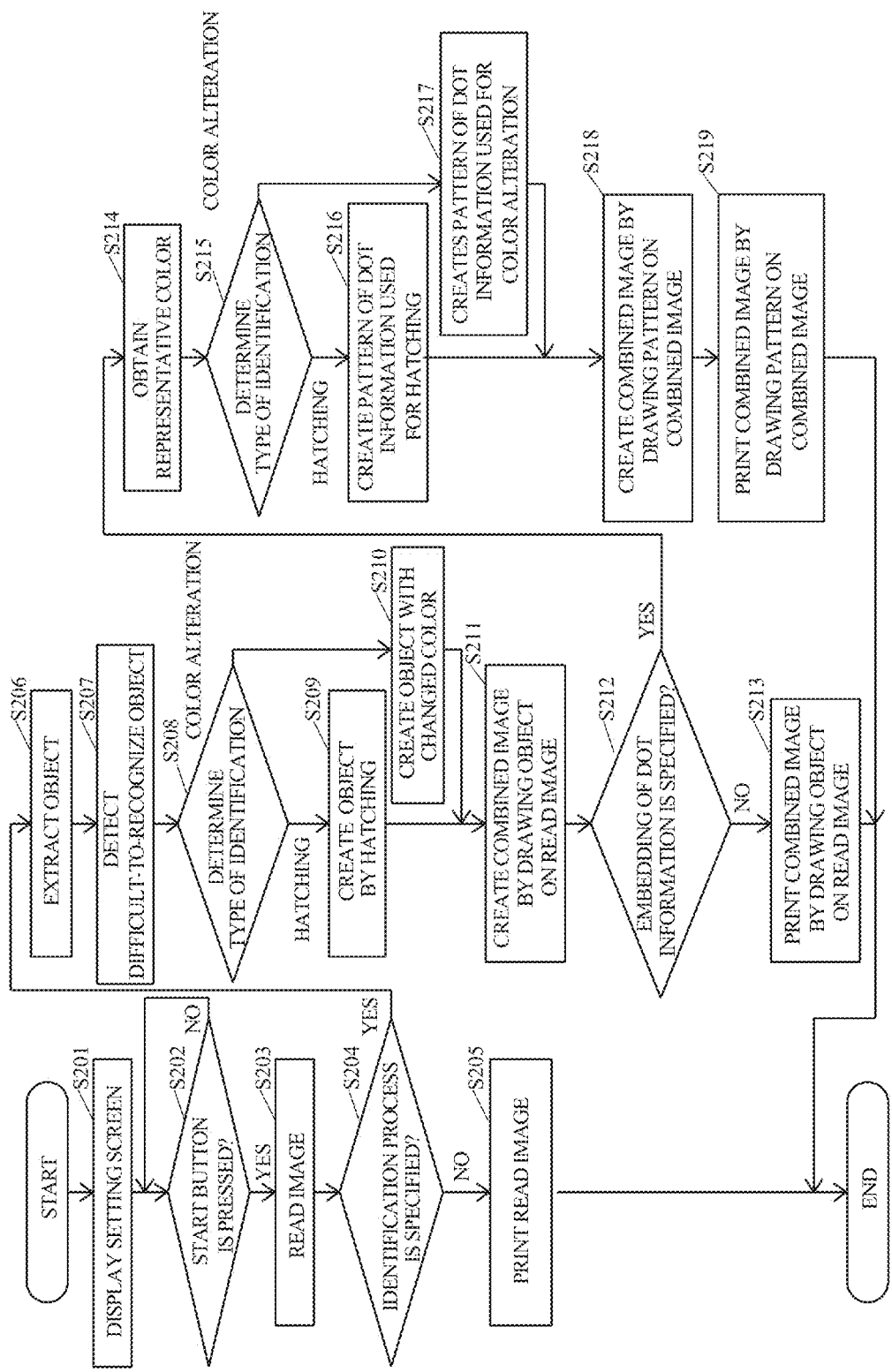
FIG. 4 shows a flowchart illustrating an operation of the MFP that is executed to perform a copy operation.

FIG. 4 shows a flowchart illustrating an operation of the MFP 20 that is executed to perform a copy operation. As illustrated in FIG. 4, the control unit 40 displays a copy setting screen, shown in FIG. 5, on the display unit 22 (S201).

Figure 5:
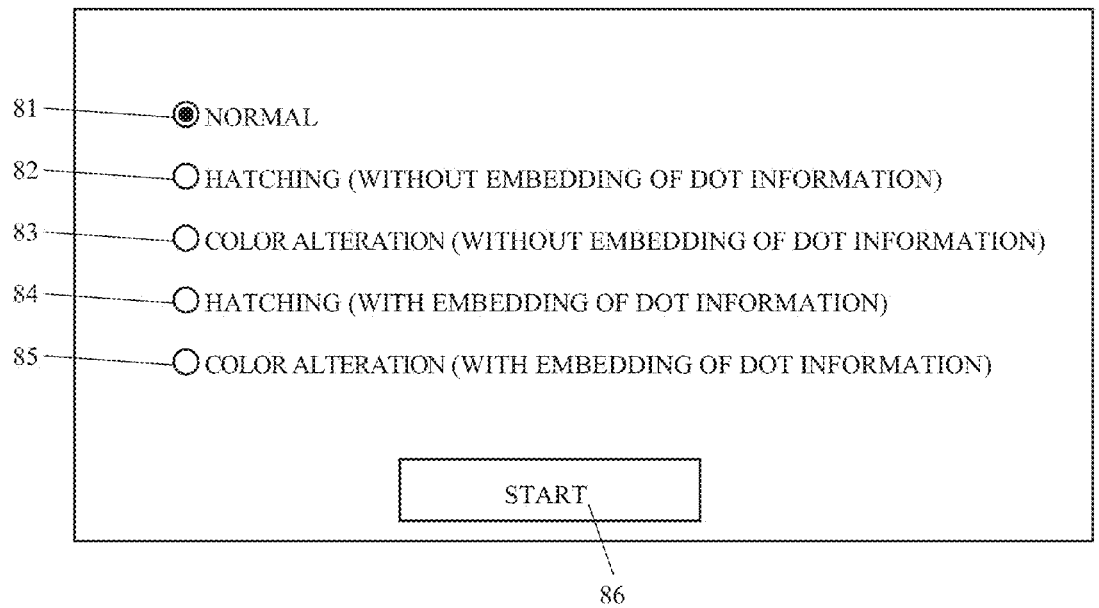
FIG. 5 shows a schematic diagram of a copy setting screen displayed on a display unit included in the MFP.

FIG. 5 shows a schematic diagram of the copy setting screen displayed on the display unit 22. The screen in FIG. 5 includes radio buttons 81 to 85 used to select a copy method and also has a start button 86 to start a copy operation. On the screen, only one of the radio buttons 81 to 85 may be selected at any given time. The radio button 81 is used to select a normal copy operation. The radio button 82 is used to select a copy operation in which visibility is improved by hatching a difficult-to-recognize object without embedding in the image information about a color represented by dots (dot information). The radio button 83 is used to select a copy operation in which visibility is improved by changing the color of a difficult-to-recognize object without embedding dot information in the image. The radio button 84 is used to select a copy operation in which (i) visibility is improved by hatching a difficult-to-recognize object and (ii) dot information is embedded in the image. The radio button 85 is used to select a copy operation in which (i) visibility is improved by changing the color of a difficult-to-recognize object and (ii) dot information is embedded in the image.

Referring again to FIG. 4, after the process in S201 is executed, the control unit 40 repeatedly determines whether the start button 86 has been pressed. This continues until the control unit 40 determines that the start button 86 has been pressed (S202).

When the control unit 40 determines that the start button 86 has been pressed in S202, the control unit 40 commands the scanner 24 to read an image from a draft placed on the scanner 24 (S203). The control unit 40 then determines whether an identification process (which improves visibility) has been specified (S204). If the radio button 81 was selected when the control unit 40 determined in S202 that the start button 86 was pressed, the control unit 40 determines that the identification process has not been specified. If one of the radio buttons 82 to 85 was selected when the control unit 40 determined in S202 that the start button 86 was pressed, the control unit 40 determines that the identification process has been specified.

If the control unit 40 determines that the identification process has not been specified in S204, the control unit 40 commands the printer 23 to print, on a recording medium, the image read from the draft in S203 (S205) and terminates the process in FIG. 4. As a result, the MFP 20 creates a recording medium, on which the image read by the scanner 24 is printed.

If the control unit 40 determines that the identification process has been specified in S204, the object extracting unit 41 in the control unit 40 extracts text, figures, and other objects from the image read in S203 by using a known image recognition technology (S206).

Next, the difficult-to-recognize object detecting unit 42 in the control unit 40 detects, from among the extracted objects, a difficult-to-recognize object that has the difficult-to-recognize color arrangement 31 (stored in the storage unit 30) as a color arrangement to the color of the periphery of the difficult-to-recognize object (S207).

Figure 6A:
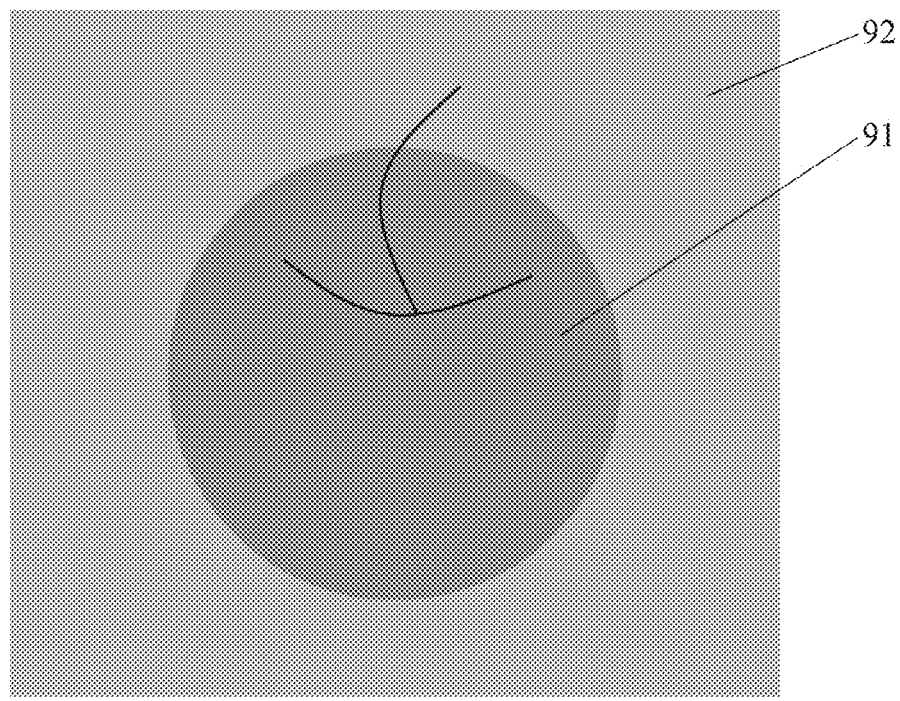
FIG. 6A shows a schematic diagram of an example of an image read from a draft by a scanner included in the MFP.
Figure 6B:
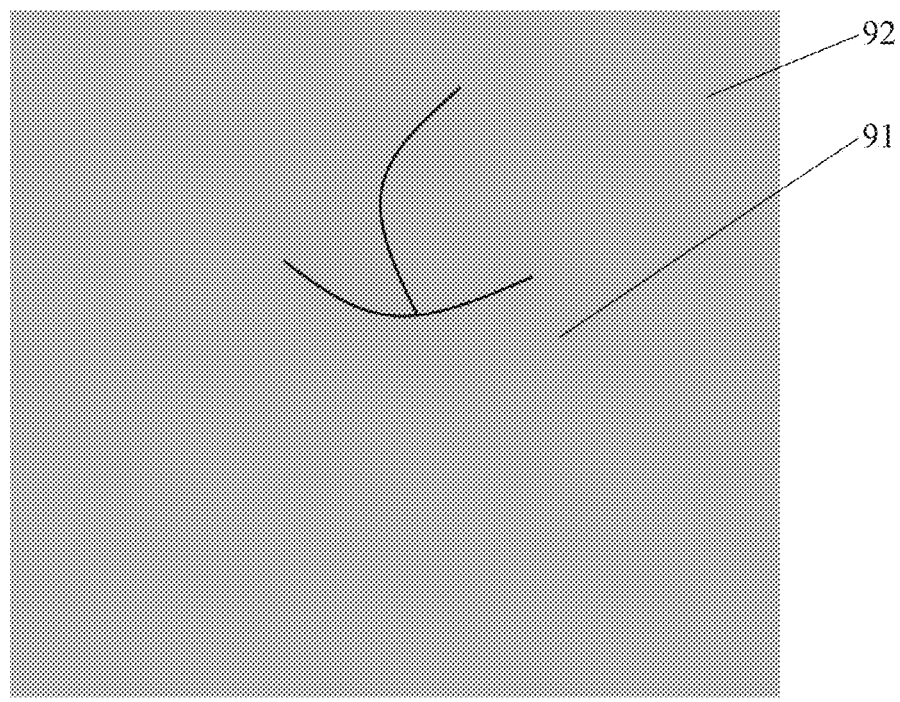
FIG. 6B shows a schematic diagram of a state in which the image read by the scanner is visually recognizable.

FIG. 6A shows a schematic diagram of an example of an image read from a draft by the scanner 24. FIG. 6B shows a schematic diagram of a state in which the image in FIG. 6A is visually recognizable. In the object 91 in FIG. 6A, the color arrangement to the peripheral color, that is, the color of the background 92, is the difficult-to-recognize color arrangement 31 stored in the storage unit 30. That is, the object 91 is a difficult-to-recognize object. Accordingly, the object 91 is difficult to visually recognize as illustrated in FIG. 6B.

Referring again to FIG. 4, after process in S207, the color arrangement changing unit 44 in the control unit 40 determines the type of specified identification process (S208). If the radio button 82 or 84 was selected when the control unit 40 determined in S202 that the start button 86 was pressed, the color arrangement changing unit 44 determines that the type of specified identification process is hatching. If the radio button 83 or 85 was selected when the control unit 40 determined in S202 that the start button 86 was pressed, the color arrangement changing unit 44 determines that the type of specified identification process is color alteration.

If the color arrangement changing unit 44 determines in S208 that the specified identification process is hatching, the color arrangement changing unit 44 creates an object by hatching the difficult-to-recognize detected in S207 (S209). The color of the hatching is a color by which the color arrangement to the color of the periphery of the difficult-to-recognize object is changed from the difficult-to-recognize color arrangement 31 stored in the storage unit 30. If the difficult-to-recognize object detecting unit 42 detects a plurality of difficult-to-recognize objects in S207, the color arrangement changing unit 44 hatches the difficult-to-recognize objects in respectively different ways, for example, by changing the angle of the segments of the hatching (referred to below as the visibility improving segments) for each difficult-to-recognize object.

Figure 7A:
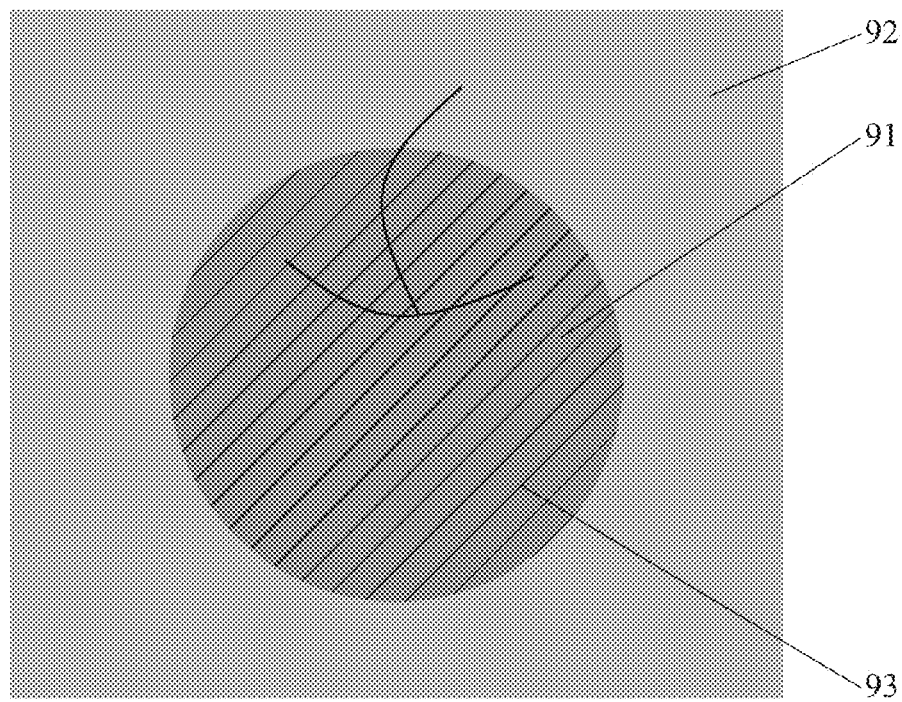
FIG. 7A shows a schematic diagram of an image in which a difficult-to-recognize object on the image read by the scanner has been hatched.
Figure 7B:
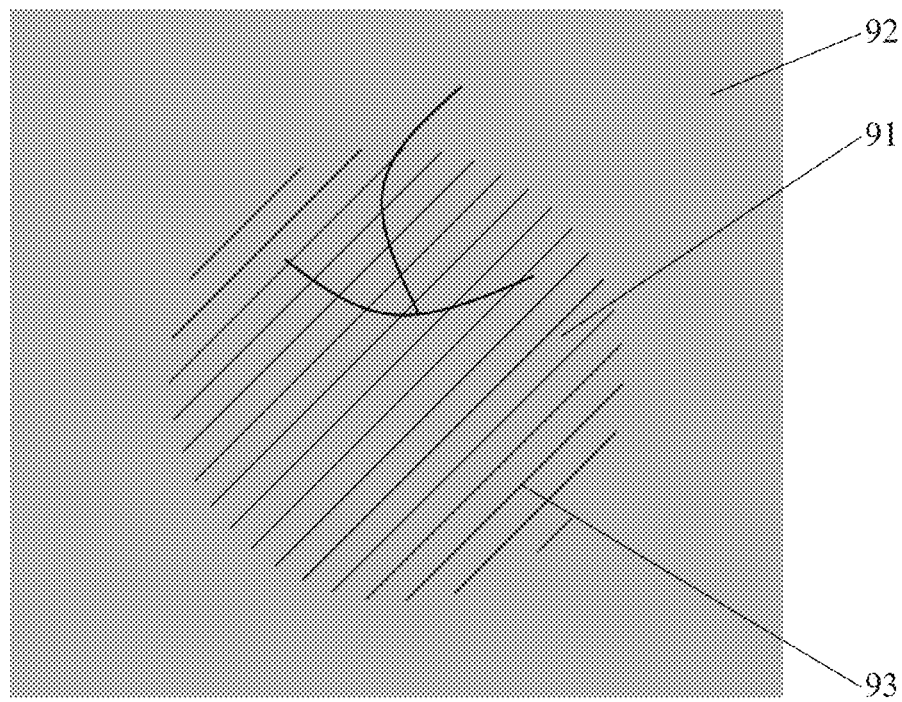
FIG. 7B shows a schematic diagram of a state in which the image including the hatched difficult-to-recognize object is visually recognizable.

FIG. 7A shows a schematic diagram of an image in which the difficult-to-recognize object on the image in FIG. 6A has been hatched. FIG. 7B illustrates a state in which the image in FIG. 7A is visually recognizable. As illustrated in FIG. 7A, a plurality of visibility improving segments 93, which together form the hatching, are drawn in the object 91, which is a difficult-to-recognize object. The color of the visibility improving segments 93 is a color by which the color arrangement to the colors of the periphery of the hatching, that is, the color of the object 91 and the color of the background 92, is changed from the difficult-to-recognize color arrangement 31 stored in the storage unit 30. Accordingly, although the object 91 itself is not easily directly visually recognized, the object 91 is indirectly visually recognizable because of the visibility improving segments 93 drawn in the object 91 as illustrated in FIG. 7B.

Referring again to FIG. 4, if the color arrangement changing unit 44 determines in S208 that the specified identification process is color alteration, the color arrangement changing unit 44 creates an object in which the color of the difficult-to-recognize object detected in S207 has been changed to a color by which the color arrangement to the color of the periphery of the difficult-to-recognize object is changed from the difficult-to-recognize color arrangement 31 stored in the storage unit 30 (referred to below as the color-changed object) (S210). If the difficult-to-recognize object detecting unit 42 detects a plurality of difficult-to-recognize objects in S207, the color arrangement changing unit 44 changes the colors of the difficult-to-recognize objects so that they have respectively different colors.

Figure 8:
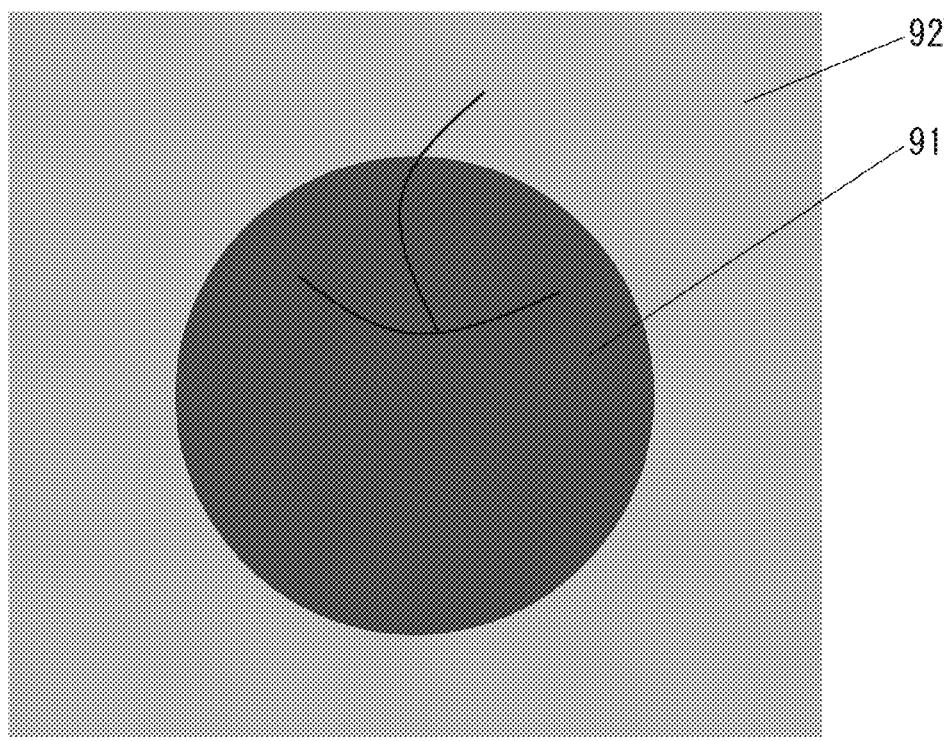
FIG. 8 shows a schematic diagram of an image in which the color of the difficult-to-recognize object on the image read by the scanner has been changed.

FIG. 8 shows a schematic diagram of an image in which the color of the difficult-to-recognize object on the image in FIG. 6A has been changed. As illustrated in FIG. 8, the color of the object 91, which is a difficult-to-recognize object, is a color by which the color arrangement to the color of the periphery of the object 91, that is, the color of the background 92, is changed from the difficult-to-recognize color arrangement 31 stored in the storage unit 30. Accordingly, the object 91 is directly visually recognizable.

Referring again to FIG. 4, after the process in S209 or S210 is executed, the color arrangement changing unit 44 creates a combined image by drawing the object that has undergone the identification process in the process in S209 or S210 (S211). The control unit 40 then determines whether the embedding of dot information has been specified (S212). If the radio button 82 or 83 was selected when the control unit 40 determined in S202 that the start button 86 was pressed, the control unit 40 determines that the embedding of dot information has not been specified. If the radio button 84 or 85 was selected when the control unit 40 determined in S202 that the start button 86 was pressed, the control unit 40 determines that the embedding of dot information has been specified.

If the control unit 40 determines in S212 that the embedding of dot information has not been specified, the changed image printing unit 45 in the control unit 40 commands the printer 23 to print the image created in S211 on a recording medium (S213) and terminates the process in FIG. 4. As a result, the MFP 20 creates a recording medium, on which a combined image is printed, the combined image being created by drawing the object that has undergone the identification process on the image read from the draft by the scanner 24.

If the control unit 40 determines in S212 that the embedding of dot information has been specified, the representative color obtaining unit 43 in the control unit 40 obtains the representative color of the difficult-to-recognize object detected in S207 (S214). The representative color is, for example, the mode value of the target difficult-to-recognize object. If the difficult-to-recognize object detecting unit 42 detects a plurality of difficult-to-recognize objects in S207, the representative color obtaining unit 43 obtains the representative color for each difficult-to-recognize object.

The color arrangement changing unit 44 in the control unit 40 then determines the type of specified identification process (S215). If the radio button 84 was selected when the control unit 40 determined in S202 that the start button 86 was pressed, the color arrangement changing unit 44 determines that the type of specified identification process is hatching. If the radio button 85 was selected when the control unit 40 determined in S202 that the start button 86 was pressed, the color arrangement changing unit 44 determines that the type of specified identification process is color alteration.

If the color arrangement changing unit 44 determines in S215 that the specified identification process is hatching, the color arrangement changing unit 44 creates a pattern of dot information used for hatching according to the representative color obtained in S214 (S216). The color arrangement changing unit 44 creates a pattern of dot information for each visibility improving segment of the object created in S209.

Figure 9:
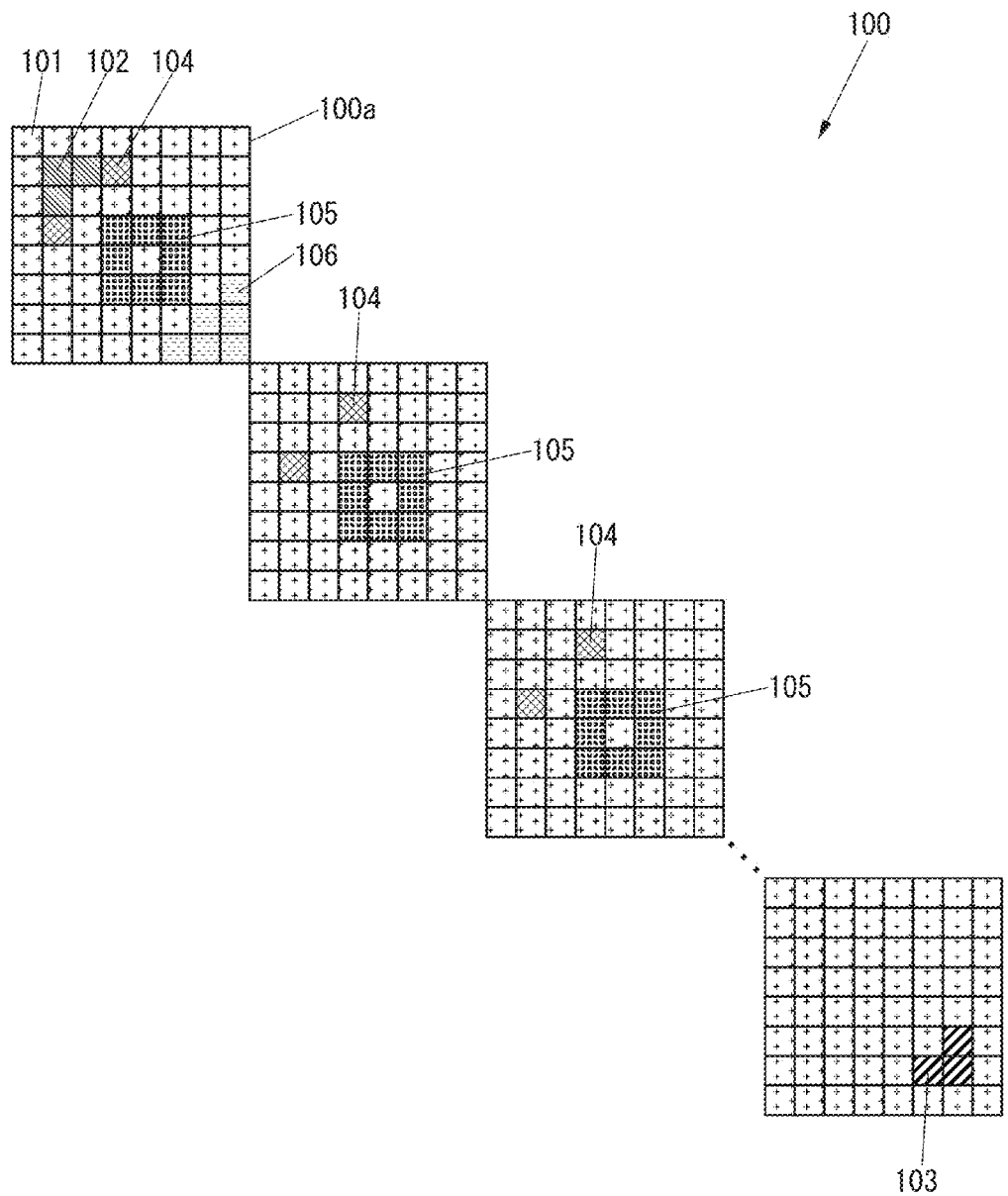
FIG. 9 shows a schematic diagram of an example of the structure of a pattern of dot information used for hatching, the pattern being created by a color arrangement changing unit included in the MFP.

FIG. 9 shows a schematic diagram of an example of the structure of a pattern 100 of dot information used for hatching, the pattern 100 being created by the color arrangement changing unit 44. The pattern 100 in FIG. 9 is formed with at least four blocks 100a, each of which is a rectangular block having a total of 64 zones, eight vertical zones by eight horizontal zones. The pattern 100 has the same shape and the same size as the visibility improving segments. One zone corresponds to one dot that is part of an image. For explanatory purposes, some zones in FIG. 9 are hatched in different ways for different functions.

The pattern 100 includes colorless and transparent zones 101, which is colorless and transparent so that the color of the visibility improving segments appears in a process of image combination in S218, which will be described later.

The pattern 100 further includes three start position indicating zones 102, which function to indicate a position from which to start the embedding of dot information. All the start position indicating zones 102 are included in a block 100a at one end of all the blocks 100a of the pattern 100. The colors of the start position indicating zones 102 are unified to a single color (black, for example) that is different from the color of the visibility improving segments.

The pattern 100 further includes three end position indicating zones 103, which function to indicate a position at which to end the embedding of the dot information. All the end position indicating zones 103 are included in another block 100a at another end of all the blocks 100a of the pattern 100, the other end being opposite to the end at which the block 100a to which the start position indicating zones 102 belong is positioned. The colors of the end position indicating zones 103 are unified to a single color (white, for example) that is different from the color of the visibility improving segments. Since a recording medium is normally white, in actual practice, white is often a color that is not printed.

The pattern 100 further includes six color element indicating zones 104, each of which has a function that indicates any one element, R, G or B, of the representative color obtained in S214. Two color element indicating zones 104 that are mutually closest are paired. In one pattern 100, the color element indicating zones 104 are included in only three blocks 100a; each of the three blocks 100a includes one pair of color element indicating zones 104. In one pattern 100, the three blocks 100a including the color element indicating zones 104 may be any three of the blocks 100a. One pair of color element indicating zones 104 has two-bit information, which represents one of four combinations of two different colors (white and black, for example) different from the color of the visibility improving segments. For example, when the upper-right zone and lower-left zone in the drawing are both white, the one pair of color element indicating zones 104 indicates an R value; when the upper-right zone in the drawing is white and the lower-left zone in the drawing is black, the one pair of color element indicating zones 104 indicates a G value; when the upper-right zone in the drawing is black and the lower-left zone in the drawing is white, the one pair of color element indicating zones 104 indicates a B value.

The pattern 100 further includes gray-scale indicating zones 105, each of which functions to indicate the gray scale of the representative color obtained in S214. The gray-scale indicating zones 105 indicate the gray scale of a color element indicated by the color element indicating zones 104 included in the block 100a to which the gray-scale indicating zones 105 belong. Eight gray-scale indicating zones 105 are included for each pair of color element indicating zones 104. The eight gray-scale indicating zones 105 have eight-bit information, which represents one of 256 combinations of two different colors (white and black, for example) different from the color of the visibility improving segments. For example, of the eight gray-scale indicating zones 105, the upper-left zone in the drawing corresponds to the eighth digit of a binary number, the zone one zone to the right of the upper-left zone in the drawing corresponds to the seventh digit, the upper-right zone in the drawing corresponds to the sixth digit, the zone one zone below the upper-left zone in the drawing corresponds to the fifth digit, the zone one zone below the upper-right zone in the drawing corresponds to the fourth digit, the lower-left zone in the drawing corresponds to the third digit, the zone one zone to the right of the lower-left zone in the drawing corresponds to the second digit, and the lower-right zone in the drawing corresponds to the first digit. Black corresponds to 1 in binary, and white corresponds to 0 in binary.

Figure 10:
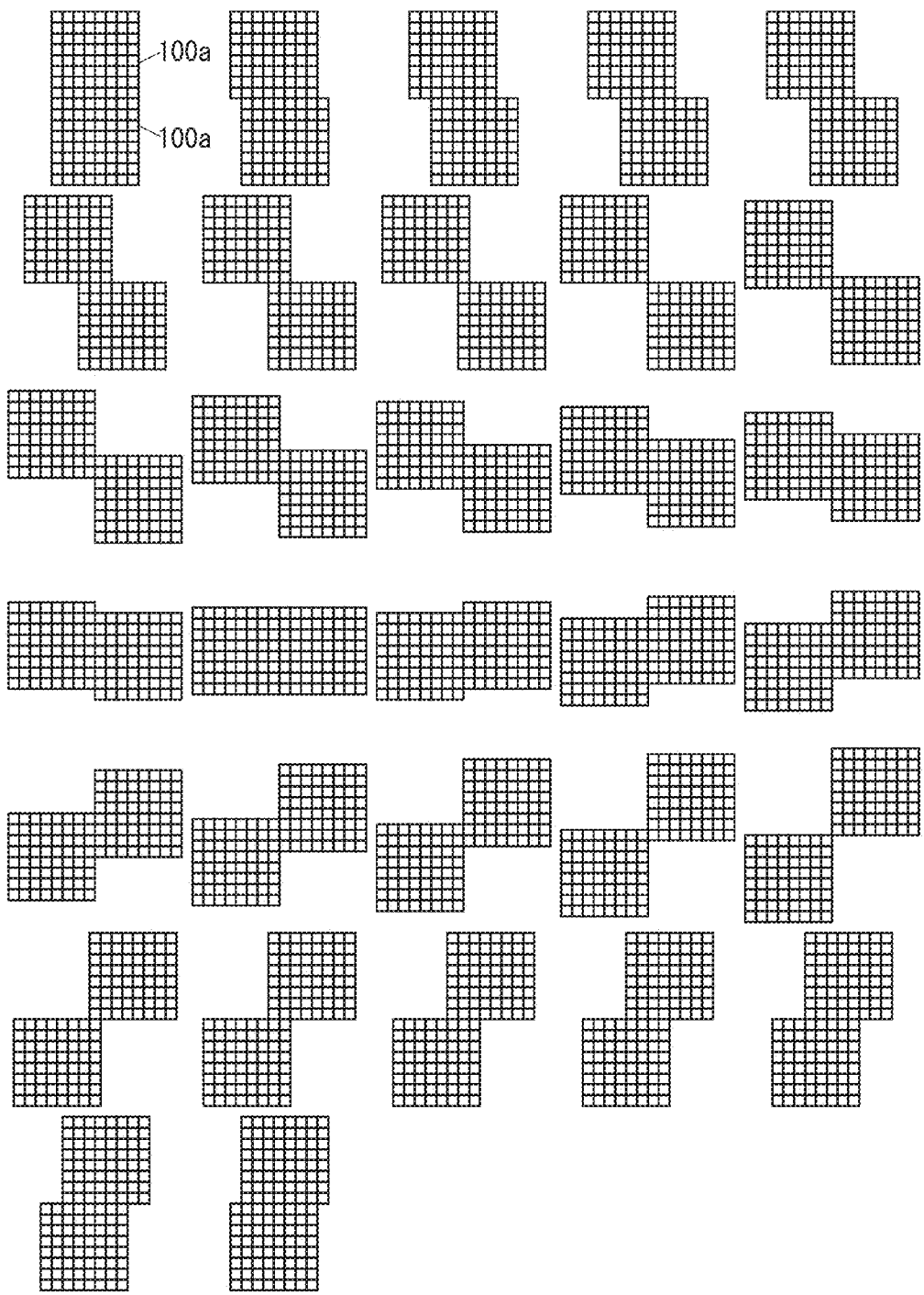
FIG. 10 shows a schematic diagram of types of directions in which blocks of the pattern of dot information used for hatching are placed.

The pattern 100 further includes direction indicating zones 106, each of which has a function that indicates a direction in which a plurality of blocks 100a are arranged, that is, an angle of the visibility improving segments. Six direction indicating zones 106 are included in the block 100a in which the start position indicating zones 102 are included. The six direction indicating zones 106 have six-bit information, which represents one of 64 combinations of two different colors (white and black, for example) different from the color of the visibility improving segments. There are 32 directions, as illustrated in FIG. 10, in which the blocks 100a may be arranged.

Figure 11:
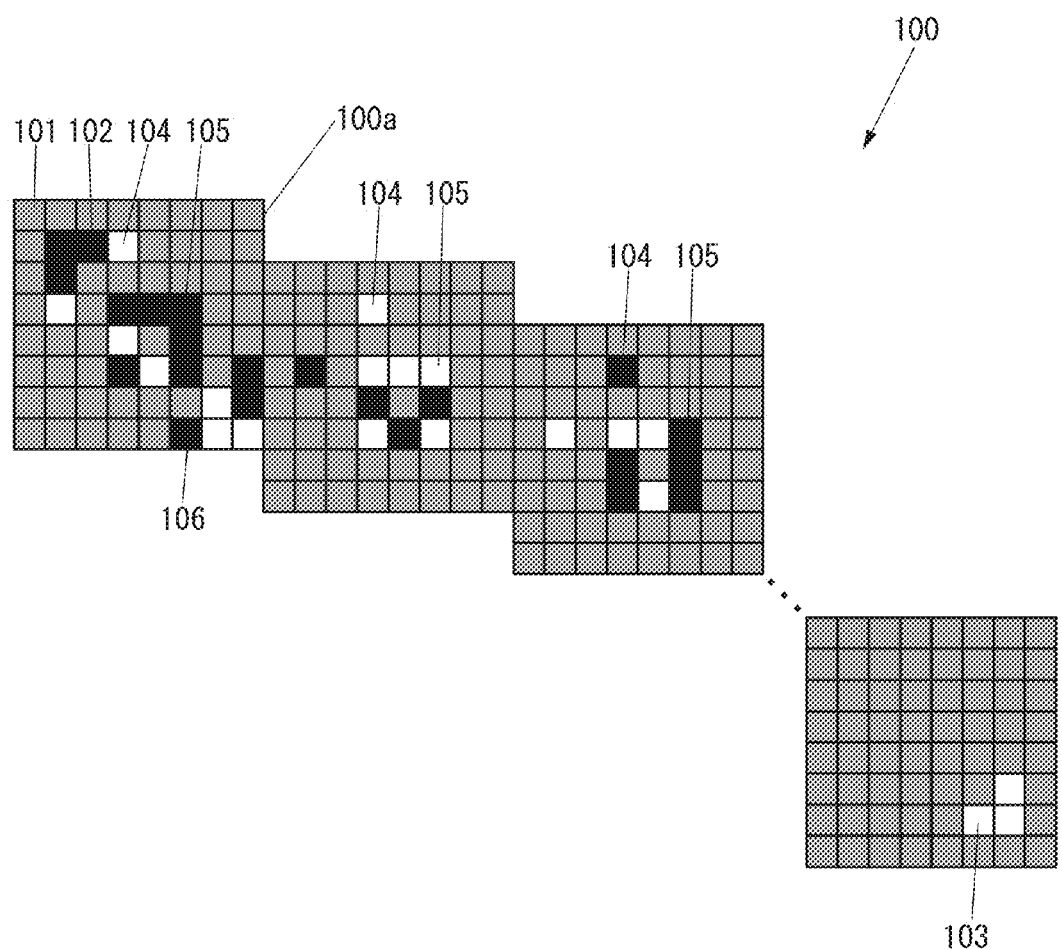
FIG. 11 shows a schematic diagram of a specific example of the pattern, having the structure illustrated in FIG. 9, of dot information used for hatching, the pattern being created by the color arrangement changing unit.

FIG. 11 shows a schematic diagram of a specific example of the pattern 100, having the structure illustrated in FIG. 9, of dot information used for hatching, the pattern 100 being created by the color arrangement changing unit 44. With the pattern 100 in FIG. 11, the representative color obtained in S214 is such that the R value is 237, the G value is 26, and the B value is 61. The leftmost block 100a in the drawing indicates that the R value is 237 (11101101 in binary). The second block 100a from the left in the drawing indicates that the G value is 26 (00011010 in binary). The third block 100a from the left in the drawing indicates that the B value is 61 (00111101 in binary). In FIG. 11, to distinguish colorless and transparent zones and white zones in the drawing, the colorless and transparent zones 101, which are colorless and transparent, are grayed. In practice, however, the colorless and transparent zones 101 are colorless and transparent zones.

Referring again to FIG. 4, the color arrangement changing unit 44 determines in S215 that the type of specified identification process is color alteration, the color arrangement changing unit 44 creates a pattern of dot information used for color alteration (S217). The color arrangement changing unit 44 creates a pattern of dot information for each color-changed object created in S210.

Figure 12:
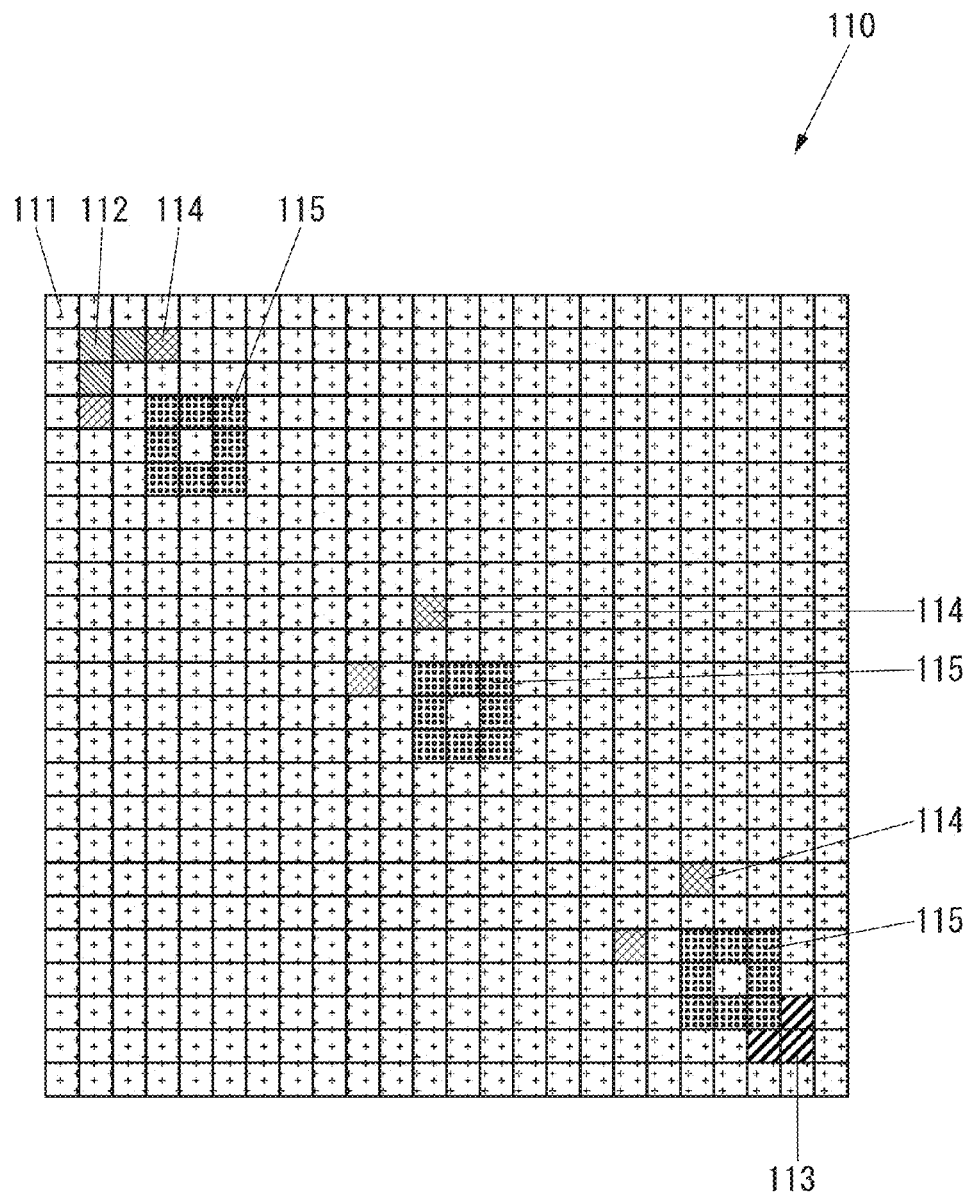
FIG. 12 shows a schematic diagram of an example of the structure of a pattern of dot information used to change a color, the pattern being created by the color arrangement changing unit.

FIG. 12 shows a schematic diagram of an example of the structure of a pattern 110 of dot information used for color alteration, the pattern 110 being created by the color arrangement changing unit 44. The pattern 110 in FIG. 12 is a rectangular block, which is formed with a total of 576 zones, 24 vertical zones by 24 horizontal zones. The pattern 110 is large enough to include at least part of the corresponding color-changed object. One zone corresponds to one dot that is part of an image. For explanatory purposes, some zones in FIG. 12 are hatched in different ways for different functions.

The pattern 110 includes colorless and transparent zones 111, which are colorless and transparent so that the color of the color-changed object appears in the process of image combination in S218, which will be described later. The pattern 110 further includes three start position indicating zones 112, which function to indicate a position from which to start the embedding of dot information. The colors of the start position indicating zones 112 are unified to a single color (black, for example) that is different from the color of the color-converted object. The pattern 110 also includes three end position indicating zones 113, which function to indicate a position at which to end the embedding of the dot information. The colors of the end position indicating zones 113 are unified to a single color (white, for example) that is different from the color of the color-converted object.

The pattern 110 further includes six color element indicating zones 114, each of which has a function that indicates any one element, R, G or B, of the representative color obtained in S214. Two color element indicating zones 114 that are mutually closest are paired. In one pattern 110, only three pairs of color element indicating zones 114 are included. One pair of color element indicating zones 114 has two-bit information, which represents one of four combinations of two different colors (white and black, for example) different from the color of the color-converted object. For example, when the upper-right zone and lower-left zone in the drawing are both white, the one pair of color element indicating zones 114 indicate an R value; when the upper-right zone in the drawing is white and the lower-left zone in the drawing is black, the one pair of color element indicating zones 114 indicate a G value; when the upper-right zone in the drawing is black and the lower-left zone in the drawing is white, the one pair of color element indicating zones 114 indicate a B value.

The pattern 110 further includes gray-scale indicating zones 115, each of which function to indicate the gray scale of the representative color obtained in S214. The gray-scale indicating zones 115 indicate the gray scale of a color element indicated by one pair of color element indicating zones 114 that are present at positions closest to the gray-scale indicating zones 115. Eight gray-scale indicating zones 115 are included for each pair of color element indicating zones 114 that are mutually closest. The eight gray-scale indicating zones 115 have eight-bit information, which represents one of 256 combinations of two different colors (white and black, for example) different from the color of the visibility improving segments. For example, of the eight gray-scale indicating zones 115, the upper-left zone in the drawing corresponds to the eighth digit of a binary number, the zone one zone to the right of the upper-left zone in the drawing corresponds to the seventh digit, the upper-right zone in the drawing corresponds to the sixth digit, the zone one zone below the upper-left zone in the drawing corresponds to the fifth digit, the zone one zone below the upper-right zone in the drawing corresponds to the fourth digit, the lower-left zone in the drawing corresponds to the third digit, the zone one zone to the right of the lower-left zone in the drawing corresponds to the second digit, and the lower-right zone in the drawing corresponds to the first digit. Black corresponds to 1 in binary, and white corresponds to 0 in binary.

Figure 13:
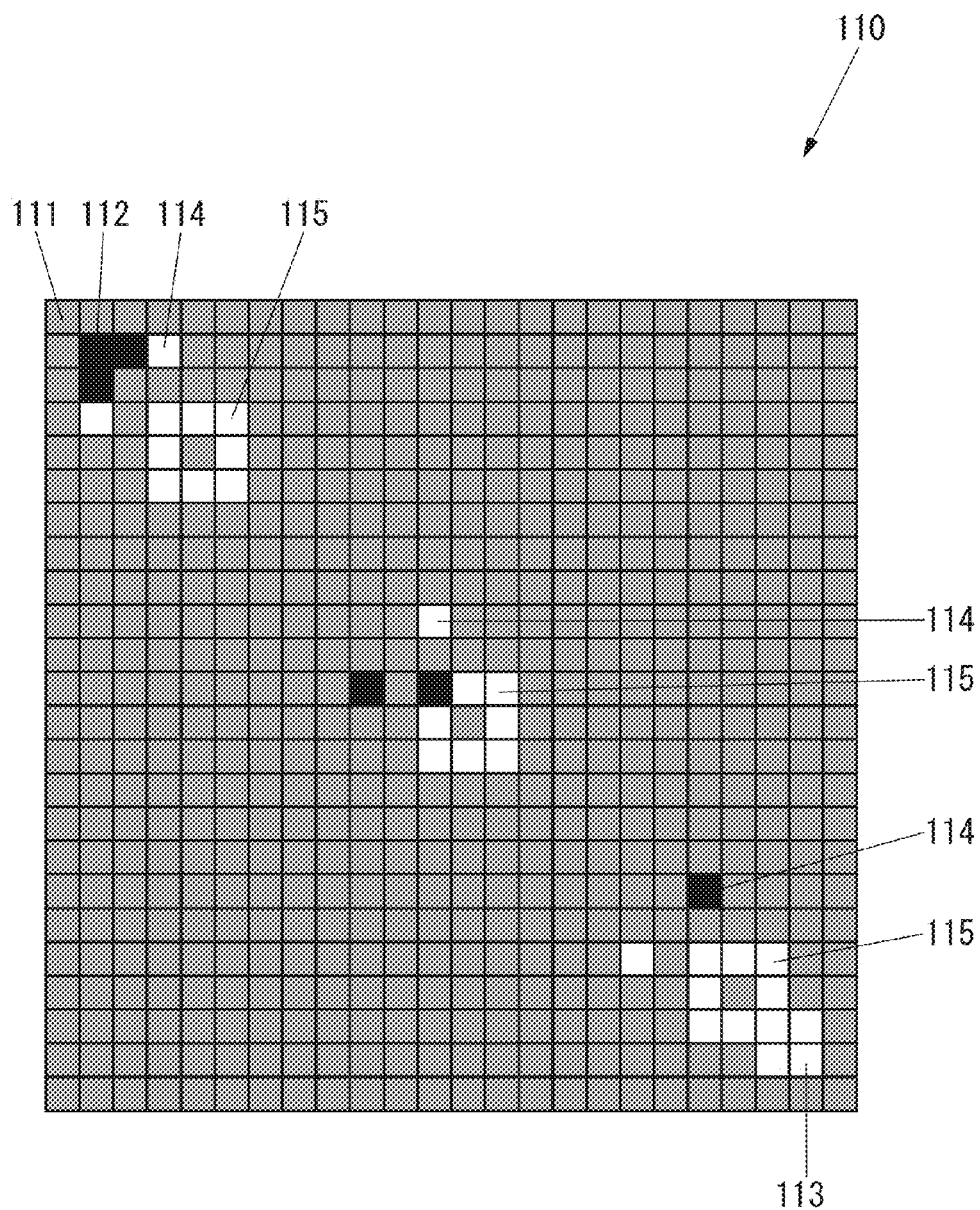
FIG. 13 shows a schematic diagram of a specific example of the pattern, having the structure illustrated in FIG. 12, of dot information used to change a color, the pattern being created by the color arrangement changing unit.

FIG. 13 shows a schematic diagram of a specific example of the pattern 110, having the structure illustrated in FIG. 12, of dot information used for color alteration, the pattern 110 being created by the color arrangement changing unit 44. With the pattern 110 in FIG. 13, the representative color obtained in S214 is such that the R value is 0, the G value is 128, and the B value is 0. The leftmost pair of color element indicating zones 114 and leftmost eight gray-scale indicating zones 115 in the drawing indicate that the R value is 0 (00000000 in binary). The second pair of color element indicating zones 114 from the left and second eight gray-scale indicating zones 115 from the left in the drawing indicate that the G value is 128 (10000000 in binary). The third pair of color element indicating zones 114 from the left and third eight gray-scale indicating zones 115 from the left in the drawing indicate that the B value is 0 (00000000 in binary). In FIG. 13, to distinguish colorless and transparent zones and white zones in the drawing, the colorless and transparent zones 111, which are colorless and transparent, are grayed. In practice, however, the colorless and transparent zones 111 are colorless and transparent zones.

Referring again to FIG. 4, after the process in S216 or S217 is executed, the color arrangement changing unit 44 creates a combined image by drawing the dot information pattern created in the process in S216 or S217 on the image created in S211 (S218). Then, the changed image printing unit 45 in the control unit 40 commands the printer 23 to print the image created in S218 on a recording medium (S219) and terminates the process in FIG. 4. As a result, the MFP 20 creates a recording medium, on which a combined image is printed, the combined image being created by (i) drawing the object that has undergone the identification process on the image read by the scanner 24 to create a combined image and (ii) drawing the dot information pattern on the combined image.

Next, an operation of the MFP 20 that is executed to perform a printing operation by using print data transmitted from the PC 50 will be described. The control unit 40 in the MFP 20 prints by using print data transmitted from the PC 50 in any one of printing methods set on a setting screen similar to the setting screen illustrated in FIG. 5. The control unit 40 selects any one of the following printing methods on the setting screen: normal printing, printing in which visibility is improved by hatching a difficult-to-recognize object without embedding dot information in the image, printing in which visibility is improved by changing the color of a difficult-to-recognize object without embedding dot information in the image, printing in which (i) visibility is improved by hatching a difficult-to-recognize object and (ii) dot information is embedded in the image, and printing in which (i) visibility is improved by changing the color of a difficult-to-recognize object and (ii) dot information is embedded in the image.

Figure 14:
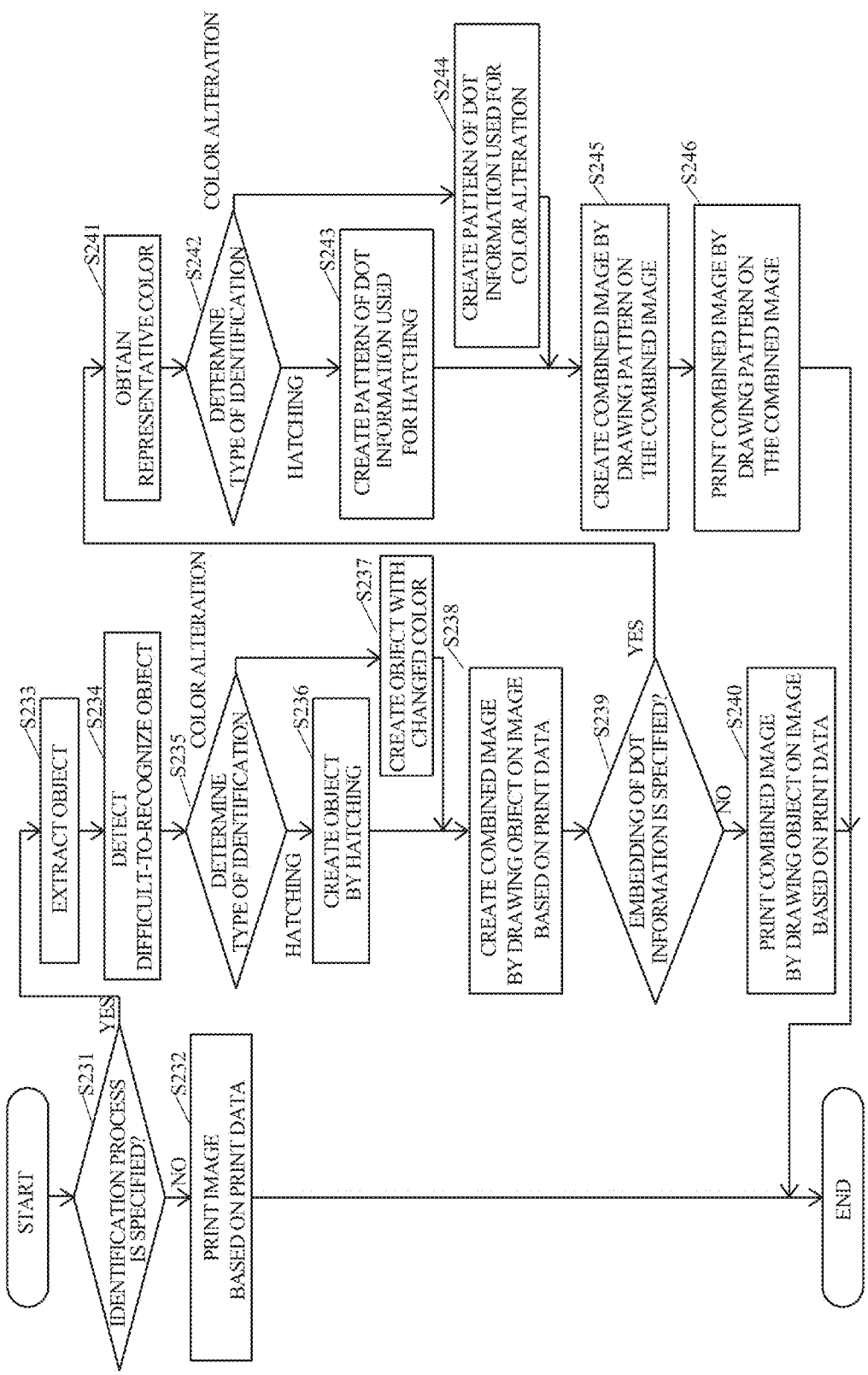
FIG. 14 shows a flowchart illustrating an operation of the MFP that is executed to perform a printing operation by using print data transmitted from the PC.

Upon receiving of print data from the PC 50, the control unit 40 starts process illustrated in FIG. 14.

FIG. 14 shows a flowchart illustrating an operation of the MFP 20 that is executed to perform a printing operation by using print data transmitted from the PC 50. As illustrated in FIG. 14, the control unit 40 in the MFP 20 performs the same process as in S204 to S219 in FIG. 4, except that the control unit 40 performs the process on an image based on print data rather than the image read from the draft by the scanner 24 (S231 to S246).

Next, an operation of the MFP 20 that is executed to restore the original image from a recording medium on which an image with dot information embedded has been printed will be described. After setting, on the scanner 24, a recording medium on which an image with dot information embedded has been printed as a draft, the user can manipulate the manipulating unit 21 to command the MFP 20 to restore the original image. When the user manipulates the manipulating unit 21 to command the MFP 20 to restore the original image, the control unit 40 in the MFP 20 starts process illustrated in FIG. 15.

Figure 15:
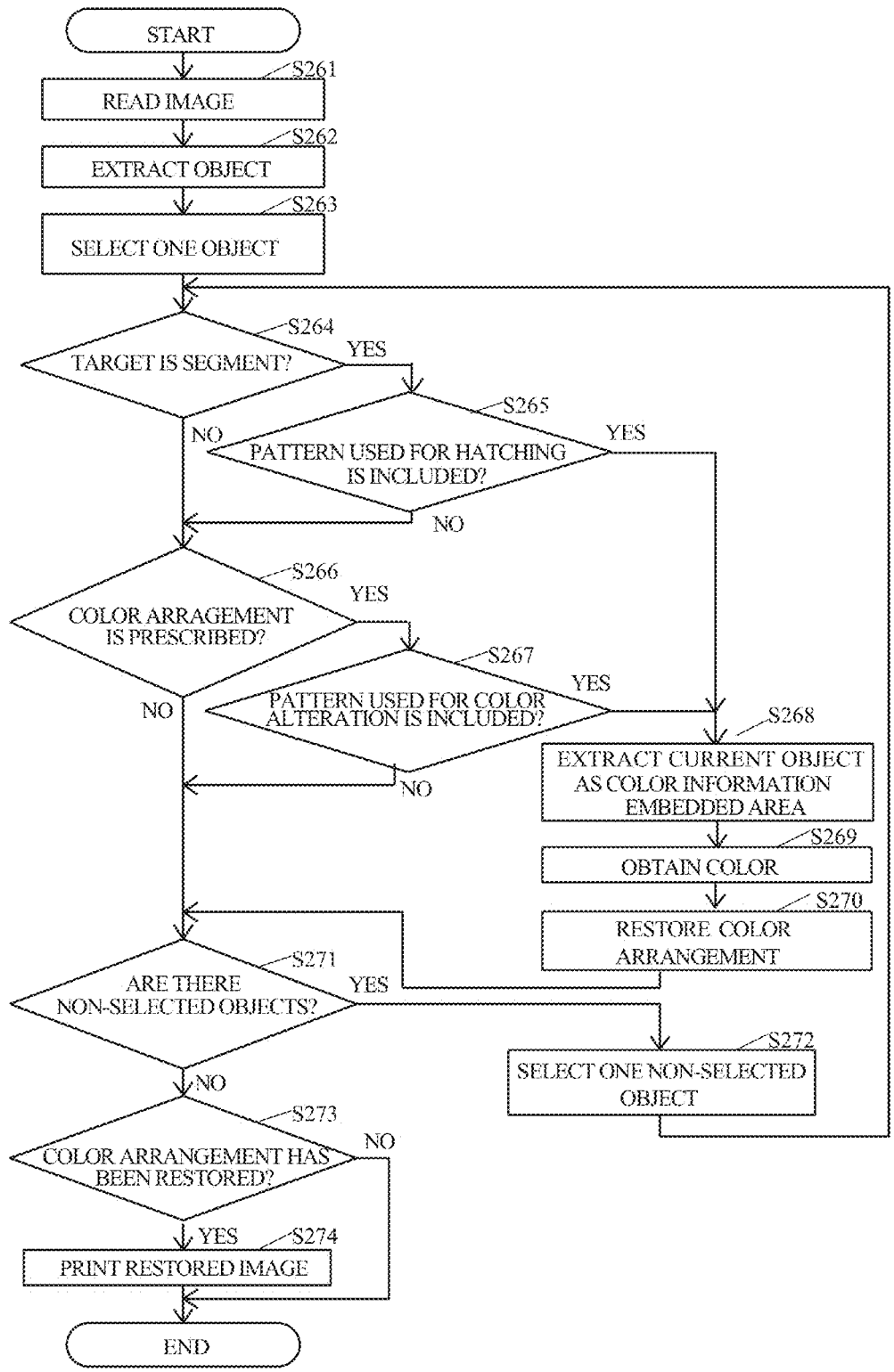
FIG. 15 shows a flowchart illustrating an operation of the MFP that is executed to restore the original image from a recording medium on which an image with dot information embedded has been printed.

FIG. 15 shows a flowchart illustrating an operation of the MFP 20 that is executed to restore the original image from a recording medium on which an image with dot information embedded has been printed. As illustrated in FIG. 15, the control unit 40 commands the scanner 24 to read an image from a draft set on the scanner 24 (S261). Next, the area extracting unit 46 in the control unit 40 extracts text, figures, and other objects from the image read in S261 by using a known image recognition technology (S262). The area extracting unit 46 then selects one object from the objects extracted in S262 as a target to be processed (S263). The area extracting unit 46 then determines whether the object currently selected as the target is a segment object (S264).

If the area extracting unit 46 determines in S264 that the current object is a segment object, the area extracting unit 46 determines whether the current object includes the pattern 100, illustrated in FIG. 9, of dot information used for hatching (S265). If the area extracting unit 46 determines in S264 that the current object is not a segment object or determines in S265 that the current object does not include the pattern 100 of dot information used for hatching (as illustrated in FIG. 9), the area extracting unit 46 determines whether the color arrangement to the color of the periphery of the current object is a prescribed color arrangement (S266). The prescribed color arrangement is prestored as a color arrangement after the color alteration in S210 is executed.

If the area extracting unit 46 determines in S266 that the color arrangement to the color of the periphery of the current object is a prescribed color arrangement, the area extracting unit 46 determines whether the current object includes the pattern 110, illustrated in FIG. 12, of dot information used for color alteration (S267).

If the area extracting unit 46 determines in S265 that the current object includes the pattern 100 of dot information used for hatching (illustrated in FIG. 9) or determines in S267 that the current object includes the pattern 110, illustrated in FIG. 12, of dot information used for color alteration, the area extracting unit 46 extracts the current object as an area in which color information has been embedded as dots (S268). Next, the area color obtaining unit 47 in the control unit 40 obtains a color corresponding to the information embedded as dots in the area extracted in S268 (S269). Then, the color arrangement restoring unit 48 in the control unit 40 restores the color arrangement of the image by assigning the color obtained in S269 to the area extracted in S268 (S270).

If the area extracting unit 46 determines in S266 that the color arrangement to the color of the periphery of the current object is not the prescribed color arrangement, or determines in S267 that the current object does not include the pattern 110 of dot information (illustrated in FIG. 12) used for color alteration, or if the process in S270 terminates, the area extracting unit 46 determines that there are objects that have not been selected as targets (S271). If the area extracting unit 46 determines in S271 that there are objects that have not been selected as targets, the area extracting unit 46 selects one non-selected object as a target (S272) and returns to the process in S264. If the area extracting unit 46 determines in S271 that all objects that have been selected as targets, the control unit 40 determines in S270 whether the color arrangement has been restored (S273).

If the control unit 40 determines in S273 that the color arrangement has been restored, the restored image printing unit 49 in the control unit 40 (i) commands the printer 23 to print, on a recording medium, the image, the color arrangement of which has been restored (S274); and (ii) terminates the process illustrated in FIG. 15. As a result, the MFP 20 creates a recording medium, on which an image equivalent to the original image has been printed. If the control unit 40 determines in S273 that the color arrangement has not been restored, the control unit 40 terminates the process in FIG. 15 without proceeding to a next step.

As described above, when the identification process is hatching, the MFP 20 uses visibility improving segments to assign, to at least a partial area of an object in which a color arrangement to the color of the periphery of the object is difficult to visually recognize, a color by which the color arrangement to the color of the periphery of the object becomes easily visually recognizable (S209 and S211 as well as S236 and S238). In addition, information about the representative color of the partial area before the color arrangement has been changed is embedded as dots in the partial area after the color arrangement has been changed, that is, the area having the visibility improving segments (S216 and S218 as well as S243 and S245). Accordingly, an image (i) that has a color arrangement that has been changed to improve visibility, and (ii) from which an image equivalent to the original image can be restored, can be printed on a recording medium. When the identification process is color alteration, the MFP 20 assigns, to the entire area of an object in which a color arrangement to the color of the periphery of the object is difficult to visually recognize, a color by which the color arrangement to the color of the periphery of the object becomes easily visually recognizable (S210 and S211 as well as S237 and S238). In addition, information about the representative color of the entire area before the color arrangement has been changed is embedded as dots in the entire area after the color arrangement has been changed, that is, the area of the recolored object (S217 and S218 as well as S244 and S245). Accordingly, an image that has a color arrangement that has been changed to improve visibility, and from which an image equivalent to the original image can be restored, can be printed on a recording medium.

When the original image is an image read from a draft by the scanner 24 (S203), the image may not stored in the MFP 20. In this case, if the draft is lost, the original image is lost. Therefore, the draft needs to be strictly managed so as not to be lost. However, the MFP 20 can print, on a recording medium, an image from which an image equivalent to the original image can be restored, reducing the burden of draft management.

When identification process is hatching, the MFP 20 embeds, in the area having the visibility improving segments, dots representing a range in which information about the representative color has been embedded as dots, that is, dots to be embedded in the start position indicating zones 102 and dots to be embedded in the end position indicating zones 103 (S216 and S218 as well as S243 and S245). Accordingly, it is possible to easily detect the information, about the representative color, that has been embedded in the image on the printed recording medium. When the identification process is color alteration, the MFP 20 embeds, in the area of the recolored object, dots representing a range in which information about the representative color has been embedded as dots, that is, dots to be embedded in the start position indicating zones 112 and dots to be embedded in the end position indicating zones 113 (S217 and S218 as well as S244 and S245). Accordingly, it is possible to easily detect the information, about the representative color, that has been embedded in the image on the printed recording medium.

The start position indicating zones 102 and end position indicating zones 103 in the pattern 100 illustrated in FIG. 9 not only indicate a range in which the information about the representative color has been embedded as dots, but also indicate a range of visibility-improving lines, so the range of visibility-improving lines is clarified.

When the identification process is hatching, the MFP 20 embeds information items about a plurality of elements of the representative color, that is, information items about R, G, and B, in different rectangular blocks 100a as dots, and also embeds, in at least one of the rectangular blocks 100a, dots that indicate a direction in which other rectangular blocks 100a are present, that is, dots to be embedded in the direction indicating zones 106. When the MFP 20 embeds dots, in at least one of the rectangular blocks 100a, dots that indicate a direction in which other rectangular blocks 100a are present, the flexibility in the shape of the range in which to embed information about the representative color is increased, so the MFP 20 can embed information about the representative color in areas having various types of shapes.

When the identification process is hatching, the MFP 20 embeds information items about a plurality of elements of the representative color, that is, information items about R, G, and B, in different rectangular blocks 100a as dots, and forms an area with visibility improving segments, the thickness of one visibility improving segment being the width of the rectangular block 100a. Accordingly, the MFP 20 can reduce an area for which the color arrangement is changed as compared with a case in which the color arrangement of the entire area of a difficult-to-recognize object is changed, so the MFP 20 can print an image for which a person with normal color vision notices less loss in consistency.

In addition, the MFP 20 extracts the area in which color information has been embedded as dots from the image read from the draft by the scanner 24 (S268), and assigns the areas a color corresponding to the information embedded in the area as dots (S269 and S270). Accordingly, an image equivalent to the original image can be restored.

The structure of the pattern of dot information indicated in this embodiment is only an example. The pattern of dot information may have a structure other than the structure indicated in this embodiment.

Although the image creating apparatus having the color arrangement changing unit in the present disclosure and the image creating apparatus having the color arrangement restoring unit in the present disclosure are implemented by the same apparatus, that is, the MFP 20, they may be implemented by different apparatuses.

Although, in this embodiment, the image creating apparatus having the color arrangement changing unit in the present disclosure is an MFP, the image creating apparatus may be a dedicated printer, a dedicated copier, or another image creating apparatus other than an MFP.

Although, in this embodiment, the image creating apparatus having the color arrangement restoring unit in the present disclosure is an MFP, the image creating apparatus may be a dedicated copier or another image creating apparatus other than an MFP.

Second Embodiment

Figure 16:
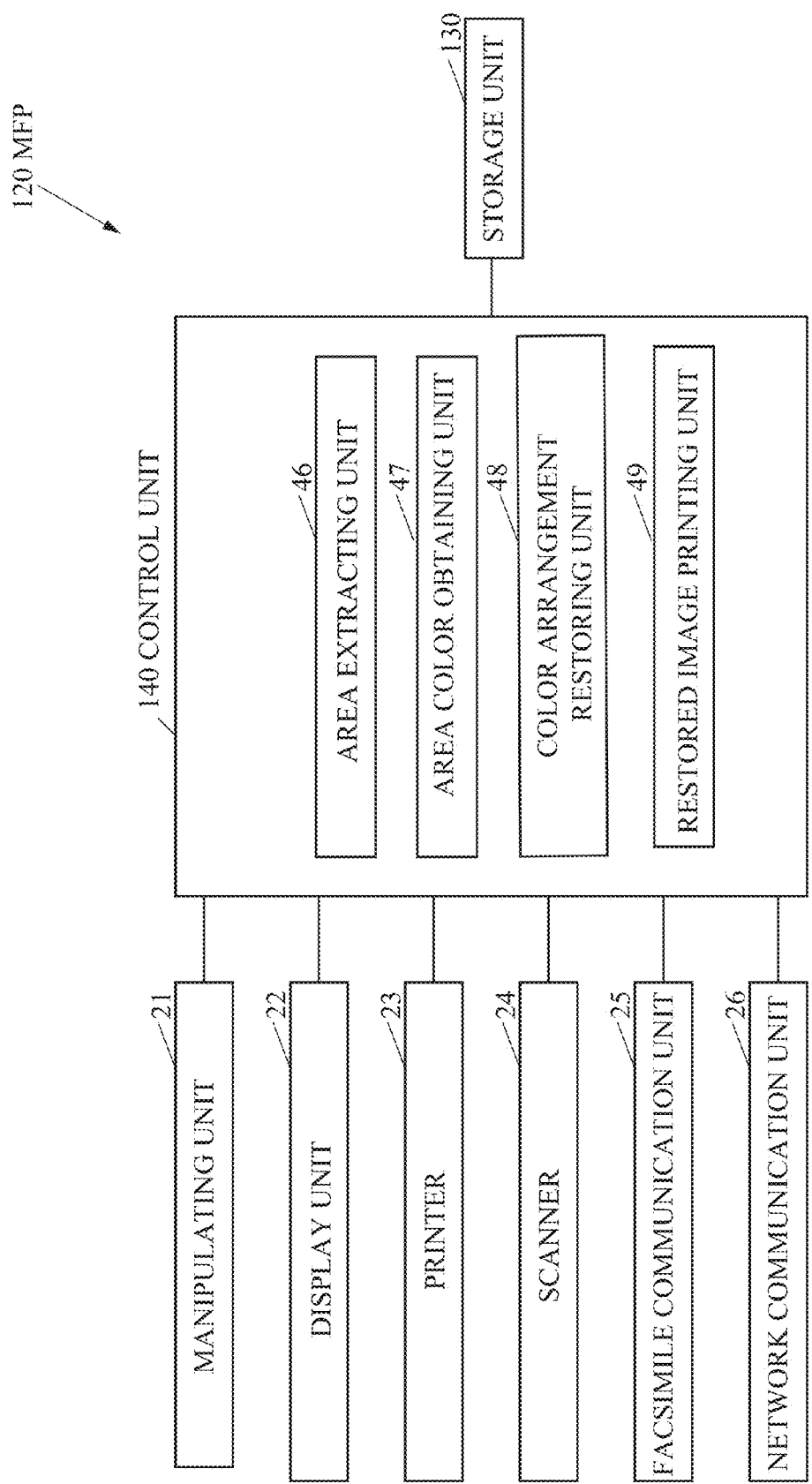
FIG. 16 shows a block diagram illustrating a configuration of the MFP in a network system in a second embodiment of the present disclosure.
Figure 17:
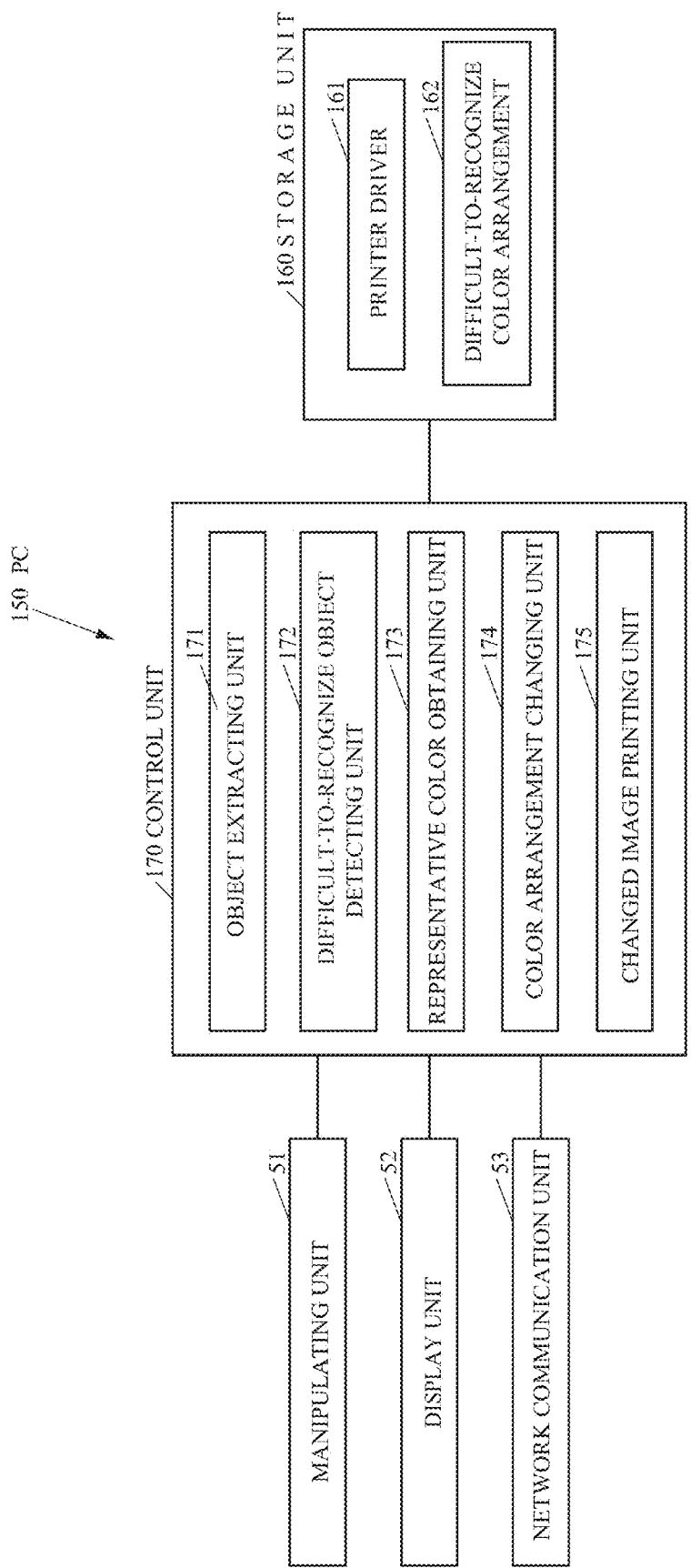
FIG. 17 shows a block diagram illustrating a configuration of the PC in the network system in the second embodiment of the present disclosure.

First, the structure of a network system in this embodiment will be described. FIG. 16 shows a block diagram illustrating the configuration of an MFP 120 in a network system in this embodiment. FIG. 17 shows a block diagram illustrating the configuration of a PC 150 in the network system in this embodiment. As illustrated in FIGS. 16 and 17, the network system in this embodiment has a structure similar to the structure of the network system 10 (see FIG. 1) in the first embodiment; the network system in this embodiment includes the MFP 120, which is a color image creating apparatus, and a PC 150, which is a computer. By comparison, the network system 10 includes the MFP 20 (see FIG. 2) and PC 50 (see FIG. 3).

As illustrated in FIG. 16, the MFP 120 has a structure similar to the structure of the MFP 20 (see FIG. 2); the MFP 120 includes a storage unit 130, which is a storage device such as an EEPROM or HDD and in which programs and various types of data are stored, and also includes a control unit 140 that controls the whole of the MFP 120. By comparison, the MFP 20 includes the storage unit 30 (see FIG. 2) and the control unit 40 (FIG. 2). The storage unit 130 has a structure similar to the structure of the storage unit 30 (see FIG. 2); however, the storage unit 130 does not store the difficult-to-recognize color arrangement 31 (see FIG. 2). The control unit 140 has a structure similar to the structure of the control unit 40 (see FIG. 2); however, the control unit 140 does not function as the object extracting unit 41 (see FIG. 2), difficult-to-recognize object detecting unit 42 (see FIG. 2), representative color obtaining unit 43 (see FIG. 2), color arrangement changing unit 44 (see FIG. 2), or changed image printing unit 45 (see FIG. 2).

As illustrated in FIG. 17, the PC 150 has a structure similar to the structure of the PC 50 (see FIG. 3); the PC 150 includes a storage unit 160, which is a storage device such as an HDD in which programs and various types of data are stored, and also includes a control unit 170 that controls the whole of the PC 150. By comparison, the PC 50 includes the storage unit 60 (see FIG. 3) and control unit 70 (see FIG. 3). The storage unit 160 has a structure similar to the structure of the storage unit 60 (see FIG. 3); the storage unit 160 stores a printer driver 161 that controls the MFP 120 and further stores a difficult-to-recognize color arrangement 162, which is a color arrangement that that is difficult to visually recognize. By comparison, the storage unit 60 includes the printer driver 61 (see FIG. 3). The storage unit 160, which stores the difficult-to-recognize color arrangement 162, constitutes the difficult-to-recognize storage unit in the present disclosure. The difficult-to-recognize color arrangement 162 includes various color arrangement patterns. The printer driver 161 may be installed on the PC 150 during the manufacturing of the PC 150. Alternatively, the printer driver 161 may be added to the PC 150 from a USB memory, a CD, a DVD or another storage medium or through the network 11.

When executing the printer driver 161 stored in the storage unit 160, the control unit 170 functions as an object extracting unit 171, a difficult-to-recognize object detecting unit 172, a representative color obtaining unit 173, a color arrangement changing unit 174, and a changed image transmitting unit 175. The object extracting unit 171 extracts objects from an image. The difficult-to-recognize object detecting unit 172 detects, from among the extracted objects, a difficult-to-recognize object 171 that has the difficult-to-recognize color arrangement 162 (stored in the storage unit 160) as a color arrangement to the color of a periphery of the difficult-to-recognize object. The representative color obtaining unit 173 obtains the representative color of the difficult-to-recognize object detected by the difficult-to-recognize object detecting unit 172. The color arrangement changing unit 174 changes the color arrangement of the image by assigning, to at least a partial area of the difficult-to-recognize object detected by the difficult-to-recognize object detecting unit 172, a color by which the color arrangement to the color of the periphery of the difficult-to-recognize object is changed from the difficult-to-recognize color arrangement 162 stored in the storage unit 160. The changed image transmitting unit 175 transmits, to the MFP 120 as print data, an image obtained as a result of the color arrangement being changed by the color arrangement changing unit 174.

Next, the operation of the network system in this embodiment will be described.

First, an operation of the PC 150 that is executed to transmit print data to the MFP 120 will be described. When the user manipulates the manipulating unit 51 to command the PC 150 to transmit print data to the MFP 120, the control unit 170 in the PC 150 starts process illustrated in FIG. 18.

Figure 18:
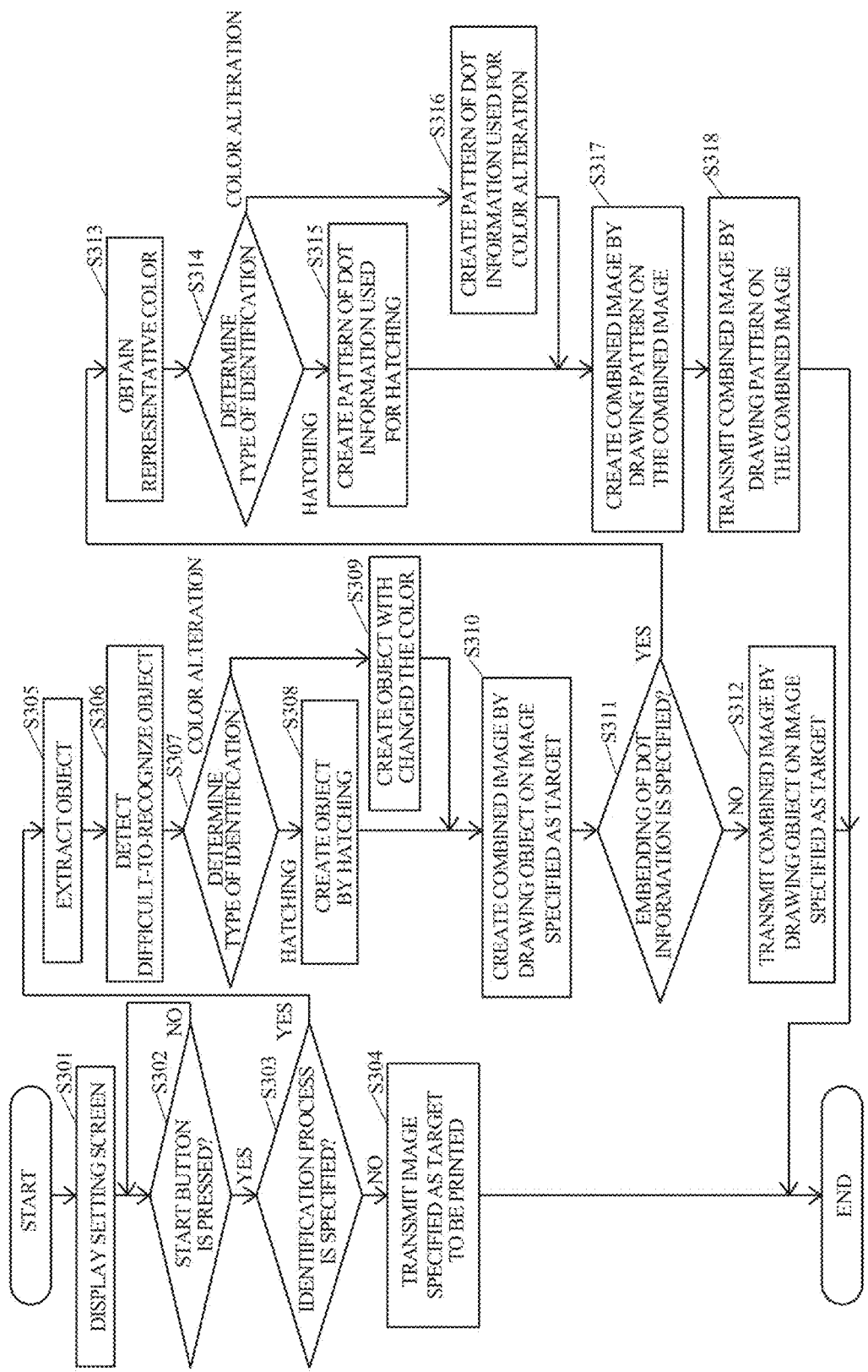
FIG. 18 shows a flowchart illustrating the operation of the PC in the network system in the second embodiment, the operation being executed when print data is transmitted to the MFP.

FIG. 18 shows a flowchart illustrating an operation of the PC 150 that is executed to transmit print data to the MFP 120. As illustrated in FIG. 18, the control unit 170 displays a setting screen, similar to the setting screen shown in FIG. 5, on the display unit 52 (S301). The control unit 170 selects any one of the following printing methods set on the setting screen: normal printing, printing in which visibility is improved by hatching the difficult-to-recognize object without embedding dot information in the image, printing in which visibility is improved by changing the color of the difficult-to-recognize object without embedding dot information in the image, printing in which (i) visibility is improved by hatching the difficult-to-recognize object and (ii) dot information is embedded in the image, and printing in which (i) visibility is improved by changing the color of the difficult-to-recognize object and (ii) dot information is embedded in the image.

After the process in S301 is executed, the control unit 170 repeatedly determines whether the start button on the setting button has been pressed. This continues until the control unit 170 determines that the start button has been pressed (S302).

If the control unit 170 determines in S302 that the start button has been pressed, the control unit 170 executes the same process as in S204, S206 to S212, and S214 to S218 in FIG. 4 except that the process is executed on the image specified as a target to be printed instead of the image read from the draft by the scanner 24 (S303, S305 to S311, and S313 to S317). Specifically, the object extracting unit 171, difficult-to-recognize object detecting unit 172, representative color obtaining unit 173, and color arrangement changing unit 174 in the control unit 170 respectively execute process similar to the process executed by the object extracting unit 41, difficult-to-recognize object detecting unit 42, representative color obtaining unit 43, and color arrangement changing unit 44 in the control unit 40 in the MFP 20 (see FIG. 2). The control unit 170 uses the difficult-to-recognize color arrangement 162 stored in the storage unit 160.

If it is determined in S303 that the identification process has not been specified, the control unit 170 commands the network communication unit 53 to transmit the image, specified as a target to be printed, to the MFP 120 as print data (S304), and terminates the process in FIG. 18. As a result, the MFP 120 creates a recording medium, on which the target image has been printed.

If it is determined in S311 that the embedding of dot information has not been specified, the changed image transmitting unit 175 in the control unit 170 commands the network communication unit 53 to transmit the image, created in S310, to the MFP 120 as print data (S312), and terminates the process in FIG. 18. As a result, the MFP 120 creates a recording medium, on which a combined image has been printed, the combined image being created by drawing the object that has undergone the identification process on the image specified as a target to be printed.

The changed image transmitting unit 175 in the control unit 170 commands the network communication unit 53 to transmit the image, created in S317, to the MFP 120 as print data (S318), and terminates the process in FIG. 18. As a result, the MFP 120 creates a recording medium, on which a combined image has been printed, the combined image being created by drawing the object that has undergone the identification process on the image specified as a target to be printed to create a combined image and further drawing the dot information pattern on the combined image.

Next, an operation of the MFP 120 that is executed to restore the original image from a recording medium on which an image with dot information embedded has been printed will be described. After setting, on the scanner 24, a recording medium on which an image with dot information embedded has been printed as a draft, the user can manipulate the manipulating unit 21 to command the MFP 120 to restore the original image. When the user manipulates the manipulating unit 21 to command the MFP 120 to restore the original image, the control unit 140 in the MFP 120 starts process illustrated in FIG. 15, as in the case with the control unit 40 (see FIG. 2) in the MFP 20 (see FIG. 2) in the first embodiment. As a result, the MFP 120 creates a recording medium, on which an image equivalent to the original image has been printed.

As described above, when the identification process is hatching, the PC 150, which executes the printer driver 161, uses visibility improving segments to assign, to at least a partial area of an object in which a color arrangement to the color of a periphery of the object is difficult to visually recognize, a color by which the color arrangement to the color of the periphery of the object becomes easily visually recognizable (S308 and S310). In addition, information about the representative color of the area before the color arrangement has been changed is embedded as dots in the area after the color arrangement has been changed, that is, the area having the visibility improving segments (S315 and S317). Accordingly, the MFP 120 can print, on a recording medium, an image that has a color arrangement that has been changed to improve visibility and from which an image equivalent to the original image can be restored. When the identification process is color alteration, the PC 150, which executes the printer driver 161, assigns, to the whole of an object in which a color arrangement to the color of a periphery of the object is difficult to visually recognize, a color by which the color arrangement to the color of the periphery of the object becomes easily visually recognizable (S309 and S310). In addition, information about the representative color of the area before the color arrangement has been changed is embedded as dots in the area after the color arrangement has been changed, that is, the area of the recolored object (S316 and S317). Accordingly, the MFP 120 can print, on a recording medium, an image that has a color arrangement that has been changed to improve visibility and from which an image equivalent to the original image can be restored.

Although, in this embodiment, the color image creating apparatus in the present disclosure is an MFP, the color image creating apparatus may be a dedicated printer or another image creating apparatus other than a MFP. Further, although the computer in the present disclosure is a PC, the computer may be a computer other than a PC in this embodiment. Moreover, although the image creating apparatus having the color arrangement restoring unit in the present disclosure is an MFP, the image creating apparatus in this embodiment may be a dedicated copier or another image creating apparatus other than an MFP.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

The invention claimed is:

1. A color-arrangement-restored image creating apparatus comprising:
   a reading device configured to read an original image from a draft;
   an area extracting unit configured to extract, from the original image read by the reading device, an area in which information about an original color that has been embedded as dots, wherein the original color is color of the original image before it has been changed;
   an area color obtaining unit configured to obtain, from the area extracted by the area extracting unit, the color corresponding to the information embedded as dots;
   a color arrangement restoring unit configured to restore a color arrangement of the original image read by the reading device by assigning the color obtained by the area color obtaining unit to the area extracted by the area extracting unit;
   a printing device configured to print, on a printing medium, a restored image obtained as a result of the color arrangement being restored by the color arrangement restoring unit; and
   a restored image printing unit configured to command the printing device to print the restored image.

2. The color-arrangement-restored image creating apparatus according to claim 1, wherein the embedded dots comprise a rectangular block formed by 576 zones.

3. The color-arrangement-restored image creating apparatus according to claim 2, wherein the 576 zones comprise 24 vertical zones by 24 horizontal zones.

4. The color-arrangement-restored image creating apparatus according to claim 1, wherein the image creating apparatus takes the form of a device selected from a group of devices consisting of a multi-function peripheral, a dedicated printer, and a dedicated copier.

* * * * *